US011377944B2

(12) United States Patent
Santra et al.

(10) Patent No.: US 11,377,944 B2
(45) Date of Patent: Jul. 5, 2022

(54) METHODS OF SUSPENDING PROPPANTS IN HYDRAULIC FRACTURING FLUID

(71) Applicant: Saudi Arabian Oil Company, Dhahran (SA)

(72) Inventors: Ashok Santra, The Woodlands, TX (US); Peter J. Boul, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 119 days.

(21) Appl. No.: 16/832,218

(22) Filed: Mar. 27, 2020

(65) Prior Publication Data

US 2020/0332638 A1    Oct. 22, 2020

Related U.S. Application Data

(60) Provisional application No. 62/835,133, filed on Apr. 17, 2019.

(51) Int. Cl.
*E21B 43/267* (2006.01)
*C09K 8/62* (2006.01)
(Continued)

(52) U.S. Cl.
CPC ............ *E21B 43/267* (2013.01); *C09K 8/602* (2013.01); *C09K 8/62* (2013.01); *C09K 8/64* (2013.01);
(Continued)

(58) Field of Classification Search
CPC ... E21B 43/267; C09K 8/602; C09K 2208/10; C09K 8/80; C09K 8/62
See application file for complete search history.

(56) References Cited

U.S. PATENT DOCUMENTS

| 4,663,230 A | 5/1987 | Tennett |
| 6,177,396 B1 | 1/2001 | Clapperton et al. |

(Continued)

FOREIGN PATENT DOCUMENTS

| CN | 104962276 B | 3/2019 |
| GB | 2520018 A | 5/2015 |

(Continued)

OTHER PUBLICATIONS

International Search Report and Written Opinion dated Jul. 1, 2020 pertaining to International application No. PCT/US2020/026103 filed Apr. 1, 2020, 18 pgs.
(Continued)

*Primary Examiner* — Catherine Loikith
(74) *Attorney, Agent, or Firm* — Dinsmore & Shohl LLP

(57) ABSTRACT

Methods of suspending proppants in a hydraulic fracturing fluid including adding a quantity of precursor nanoparticles including carbon nanotubes supported by metal oxide catalyst nanoparticles to the hydraulic fracturing fluid. The metal oxide catalyst nanoparticles and the hydraulic fracturing fluid are selected such that the metal oxide catalyst nanoparticles are dissolvable in the hydraulic fracturing fluid. The metal oxide catalyst nanoparticles dissolve in the hydraulic fracturing fluid, resulting in an amount of carbon nanotubes dispersed within the hydraulic fracturing fluid. The carbon nanotube dispersion increases the value of at least one of a Newtonian viscosity, a yield point, a plastic viscosity, and a density of the hydraulic fracturing fluid with the dispersed carbon nanotubes versus a similar or equivalent hydraulic fracturing fluid without the carbon nanotube dispersion. The method may further include adding proppants to the hydraulic fracturing fluid.

20 Claims, 1 Drawing Sheet

(51) Int. Cl.
- *C09K 8/80* (2006.01)
- *C09K 8/60* (2006.01)
- *C09K 8/64* (2006.01)
- *C09K 8/68* (2006.01)

(52) U.S. Cl.
CPC .................. *C09K 8/68* (2013.01); *C09K 8/80* (2013.01); *C09K 2208/10* (2013.01)

(56) References Cited

U.S. PATENT DOCUMENTS

| | | |
|---|---|---|
| 6,787,505 B1 | 9/2004 | Maitland et al. |
| 6,900,580 B2 | 5/2005 | Dai et al. |
| 7,799,246 B2 | 9/2010 | Bordere et al. |
| 7,968,184 B2 | 6/2011 | Humphreys et al. |
| 8,075,799 B2 | 12/2011 | Hong et al. |
| 8,469,118 B2 | 6/2013 | Passade-Boupat et al. |
| 8,763,695 B2 | 7/2014 | van Zanten |
| 8,790,615 B2 | 7/2014 | Viswanathan |
| 9,777,132 B2 | 10/2017 | Kverel et al. |
| 9,987,608 B2 | 6/2018 | Pigos |
| 10,190,370 B1 | 1/2019 | Taha et al. |
| 2006/0078489 A1 | 4/2006 | Harutyunyan et al. |
| 2006/0177659 A1 | 8/2006 | Chen et al. |
| 2007/0140951 A1 | 6/2007 | O'Brien et al. |
| 2010/0105834 A1 | 4/2010 | Tour et al. |
| 2010/0224129 A1 | 9/2010 | Malecki et al. |
| 2010/0239489 A1 | 9/2010 | Harutyunyan et al. |
| 2010/0243236 A1 | 9/2010 | Koons |
| 2010/0300759 A1 | 12/2010 | Passade-Boupat et al. |
| 2011/0011157 A1 | 1/2011 | Bourlon et al. |
| 2011/0060162 A1 | 3/2011 | Tatsuhara et al. |
| 2011/0089958 A1 | 4/2011 | Malecki et al. |
| 2011/0107942 A1 | 5/2011 | Eleto Da Silva et al. |
| 2011/0254553 A1 | 10/2011 | van Zanten |
| 2012/0015852 A1 | 1/2012 | Quintero et al. |
| 2012/0018155 A1 | 1/2012 | Patil et al. |
| 2012/0042806 A1 | 2/2012 | Hersam et al. |
| 2013/0213638 A1 | 8/2013 | Keller et al. |
| 2013/0217603 A1 | 8/2013 | Jamison et al. |
| 2014/0096964 A1* | 4/2014 | Chakraborty .......... B82Y 30/00 166/279 |
| 2014/0367091 A1 | 12/2014 | Tour et al. |
| 2015/0153472 A1* | 6/2015 | Tour ..................... G01N 33/241 324/345 |
| 2015/0284619 A1 | 10/2015 | Price Hoelscher et al. |
| 2016/0017202 A1 | 1/2016 | Yang et al. |
| 2016/0258269 A1 | 9/2016 | Musso et al. |
| 2017/0327729 A1 | 11/2017 | Salla et al. |
| 2018/0306027 A1* | 10/2018 | Sherman ................. E21B 29/02 |

FOREIGN PATENT DOCUMENTS

| | | |
|---|---|---|
| JP | 03174341 A | 7/1991 |
| RU | 2015129136 A | 1/2017 |
| WO | 03004155 A1 | 1/2003 |
| WO | 2006137942 A2 | 12/2006 |
| WO | 2007093725 A2 | 8/2007 |
| WO | 2011128615 A1 | 10/2011 |
| WO | 2012085516 A2 | 6/2012 |
| WO | 2012114068 A2 | 8/2012 |
| WO | 2013008209 A2 | 1/2013 |
| WO | 2014060686 A1 | 4/2014 |
| WO | 2015038117 A1 | 3/2015 |
| WO | 2015077524 A1 | 5/2015 |
| WO | 2017152298 A1 | 9/2017 |
| WO | 2018048569 A1 | 3/2018 |
| WO | 2018101545 A1 | 6/2018 |

OTHER PUBLICATIONS

International Search Report and Written Opinion dated Jul. 1, 2020 pertaining to International application No. PCT/US2020/026871 filed Apr. 6, 2020, 18 pgs.

International Search Report and Written Opinion dated Jul. 10, 2020 pertaining to International application No. PCT/US2020/024917 filed Mar. 26, 2020, 13 pgs.

International Search Report and Written Opinion dated Jul. 16, 2020 pertaining to International application No. PCT/US2020/028077 filed Apr. 14, 2020, 17 pgs.

Gomez et al., "Proppant immobilization facilitated by carbon nanotube mediated microwave treatment of polymer-proppant structures" Colloids and Surfaces A: Physiochemical and Engineering Aspects, Elsevier, Amsterdam, NL, vol. 513, Oct. 27, 2016, pp. 297-305.

Orbaek, Alvin W. et al., "The development of a 'process map' for the growth of carbon nanomaterials from ferrocene by injection CVD" Journal of Materials Chemistry A, vol. 1, No. 25, Jan. 1, 2013, p. 14122.

Gomez et al. "Enhanced purification of carbon nanotubes by microwave and chlorine cleaning procedures" RSC Advances, vol. 6, No. 14, Jan. 1, 2016, pp. 11895-11902.

Eftekhari et al., "High-yield synthesis of carbon nanotubes using a water-soluble catalyst support in catalytic chemical vapor deposition" Carbon, Elsevier, Oxford, GB, vol. 44, No. 7, Jun. 1, 2006, pp. 1343-1345.

International Search Report and Written Opinion dated Nov. 5, 2020 pertaining to International application No. PCT/US2020/043219 filed Jul. 23, 2020, 13 pgs.

Al-Rekabi, "Use of Carbon Nanofilaments in Producing Cementitious Composites with Improved Mechanical and Durability Performance", Thesis submitted Sep. 2017.

Azhari et al., "Cement-based sensors with carbon fibers and carbon nanotubes for piezoresistive sensing", Cement & Concrete Composites, vol. 34, pp. 866-873, 2012.

Cervantes-Sodi et al., "Selective synthesis of double helices of carbon nanotube bundles grown on treated metallic substrates", Physics Status Solidi (b), vol. 249, No. 12, pp. 2382-2385, 2012.

Cwirzen et al., "CHH Cement Composite", Cement & Concrete Research, Jan. 2009.

D'Alessandro et al., "Self-sensing and thermal energy experimental characterization of multifunctional cementmatrix composites with carbon nano-inclusions", Behavior and Mechanics of Multifunctional Materials and C omposites Proceedings vol. 9800, 2016.

D'Alessandro et al., "Static Dynamic Strain Monitoring of Reinforced Concrete Components through Embedded Carbon Nanotube Cement-Based Sensors", Hindawi, Shock and Vibration, vol. 2017, Article ID 3648403, 11 pages, Aug. 7, 2017.

Falikman et al., "Nanotechnologies in New Structural Concretes: Practice and Outlook", Concrete, Innovation and Desibn, fib Symposium, Cophenhagen, May 18-20, 2015.

Khalil et al., "Advanced nanomaterials in oil and gas industry: Design, application and challenges", Applied Energy 191, pp. 287-310, 2017.

Lamesh, et al., "Effect of the Support on Structure of the Multi-Walled Carbon Nanotubes Grown by CCVD over Nickel Nanoparticles", Journal of Advances in Nanomaterials, vol. 2, No. 3, Sep. 2017.

Mangadlao et al., "Smart cements and cement additives for oil and gas operations", Journal of Petroleum Science and Engineering, vol. 129, pp. 63-76, 2015.

Ning, et al., "Improvement of Fe/MgO Catalysts by Calcination for the Growth of Single- and Double-Walled Carbon Nanotubes", J. Phys. Chem., vol. 110, No. 3, pp. 1201-1205, 2006.

Sanchez et al., "Nanotechnology in concrete—A review", Construction and Building Materials, vol. 24, pp. 2060-2071, 2010.

Tragazikis et al., "Acoustic emission investigation of the mechanical performance of carbon nanotube-modified cement-based mortars", Construction and Building Materials, vol. 122, pp. 518-524, 2016.

Ubertini et al., Natural Frequencies Identification of a Reinforced Concrete Beam using Carbon Nanobube Cement-based Sensors, Engineering Structures, vol. 60, pp. 265-275, Feb. 2014.

Zolotarev et al., "Impact Resistance of Cement and Gypsum Plaster Nanomodified by Water-Soluble Fullerenols", Industrial & Engineering Chemistry Research, vol. 52, pp. 14583-14591, 2013.

Office Action dated Jun. 30, 2021 pertaining to U.S. Appl. No. 16/832,250, filed Mar. 27, 2020, 31 pages.

(56) References Cited

OTHER PUBLICATIONS

U.S. Office Action dated Nov. 10, 2021 pertaining to U.S. Appl. No. 16/934,637, filed Jul. 21, 2020, 35 pages.
Nasibulin, A.G. et al. "A novel cement-based hybrid material" New Journal of Physics, 11 (2009), 023013, pp. 1-12.
Chang, L. W. et al. "Magnetic Properties of Multi-Walled Carbon Nanotubes" Journal of Nanoscience and Nanotechnology, vol. 9(3), pp. 1956-1963, 2009.
U.S. Office Action dated Oct. 14, 2021 pertaining to U.S. Appl. No. 16/832,279, filed Mar. 27, 2020, 42 pages.
U.S. Notice of Allowance and Fee(s) Due dated Oct. 20, 2021 pertaining to U.S. Appl. No. 16/832,250, filed Mar. 27, 2020, 15 pages.

\* cited by examiner

METHODS OF SUSPENDING PROPPANTS IN HYDRAULIC FRACTURING FLUID

CROSS-REFERENCE TO RELATED APPLICATIONS

This application claims priority to U.S. Provisional Application No. 62/835,133, filed Apr. 17, 2019, which is incorporated by reference in its entirety.

TECHNICAL FIELD

The disclosure generally relates to hydraulic fracturing fluid, its manufacture and its use.

BACKGROUND

Hydraulic fracturing is a stimulation treatment routinely performed on oil and gas wells. Hydraulic fracturing fluids are pumped into the subsurface formation to be treated, causing fractures to open in the subsurface formation. Proppants, such as grains of sand, may be mixed with the treatment fluid to keep the fracture open when the treatment is complete.

SUMMARY

However, the ability of conventional hydraulic fracturing fluids to effectively suspend and carry proppants decreases as the temperature of the hydraulic fracturing fluid increases due to thermal thinning of the hydraulic fracturing fluid. Conventional hydraulic fracturing fluids that suspend solid materials, such as proppants, encounter difficulties as the solids separate from the liquid and settle in the wellbore. This phenomenon is commonly referred to as "sag." Sag typically occurs when the flow of hydraulic fracturing fluid through the wellbore is stopped for a period of time, during which the hydraulic fracturing fluid is static. Sag may also occur due to decreased flow or annular velocity of the hydraulic fracturing fluid. Sag may also be worsened by reduced Newtonian viscosity, yield point, plastic viscosity, or density, or reduced gel strength hydraulic fracturing fluids, reduced shear rate conditions, and downhole temperatures. Settling of the solid material may cause variations in the density of hydraulic fracturing fluid throughout the wellbore. For example, the hydraulic fracturing fluid in the bottom of the wellbore may have a greater density due to settling of the solids towards the bottom of the wellbore caused by gravity. Likewise, the hydraulic fracturing fluid near the surface may have a lesser density. Sag conditions may lead to reductions in the ability of a hydraulic fracturing fluid to prop open fractures with proppants.

Therefore, it is often desirable to use hydraulic fracturing fluids with increased rheological characteristics, such as increased Newtonian viscosity, yield point, plastic viscosity, or density. These improved rheological characteristics increase the ability of the hydraulic fracturing fluid to suspend solid materials. Furthermore, hydraulic fracturing fluids with improved rheological characteristics may have less thermal thinning as the temperature increases as compared to hydraulic fracturing fluids with reduced Newtonian viscosity, yield point, plastic viscosity, or density. Conventionally, carbon nanotubes have been added to hydraulic fracturing fluids to increase at least one of the Newtonian viscosity, yield point, plastic viscosity, or density of the hydraulic fracturing fluid. However, current methods of adding carbon nanotubes to hydraulic fracturing fluids result in clumps within the hydraulic fracturing fluid, as carbon nanotubes are conventionally added to the hydraulic fracturing fluid as a batch. Hydraulic fracturing fluids with groups of clumped carbon nanotubes do not suspend proppants as effectively as hydraulic fracturing fluids with dispersed carbon nanotubes. Although various techniques have been used to try to disperse clumped carbon nanotubes, such as ultra-sonication, or adding surfactants or polymers into the hydraulic fracturing fluid, none have resulted in dispersed carbon nanotubes.

Accordingly, an ongoing need exists for hydraulic fracturing fluids with increased Newtonian viscosity, yield point, plastic viscosity, or density and reduced thermal thinning to suspend proppants. The present embodiments address these needs by providing methods of suspending proppants in a hydraulic fracturing fluid including dispersed carbon nanotubes. The hydraulic fracturing fluids of the present disclosure may address these needs by providing improved rheology characteristics to hydraulic fracturing fluids, such as increased Newtonian viscosity, yield point, plastic viscosity, or density, and decreased thermal thinning of the hydraulic fracturing fluid with the dispersed carbon nanotubes versus a similar or equivalent hydraulic fracturing fluid without the carbon nanotube dispersion.

In one embodiment, the present disclosure relates to a method of suspending proppants in a hydraulic fracturing fluid including adding a quantity of precursor nanoparticles including carbon nanotubes supported by metal oxide catalyst nanoparticles to the hydraulic fracturing fluid. The metal oxide catalyst nanoparticles and the hydraulic fracturing fluid are selected such that the metal oxide catalyst nanoparticles are dissolvable in the hydraulic fracturing fluid. The metal oxide catalyst nanoparticles are operable to dissolve in the hydraulic fracturing fluid, which results in an amount of carbon nanotubes dispersed within the hydraulic fracturing fluid. The dispersion of the amount of carbon nanotubes increases the value of at least one of a Newtonian viscosity, a yield point, a plastic viscosity, and a density of the hydraulic fracturing fluid with the dispersed carbon nanotubes versus a similar or equivalent hydraulic fracturing fluid without the carbon nanotube dispersion. The method may further include adding proppants to the hydraulic fracturing fluid after the addition of the precursor nanoparticles. The carbon nanotubes in the hydraulic fracturing fluid aid in suspending the proppants in the hydraulic fracturing fluid such that more proppants remain suspended in the hydraulic fracturing fluid with the dispersed carbon nanotubes versus a similar or equivalent hydraulic fracturing fluid without the carbon nanotube dispersion.

In another embodiment, the method may include synthesizing carbon nanotubes via chemical vapor deposition on metal oxide catalyst nanoparticles to form a quantity of precursor nanoparticles, in which individual nanoparticles of the metal oxide catalyst nanoparticles include a transition metal disposed on a metal oxide, and adding the quantity of precursor nanoparticles to the hydraulic fracturing fluid, in which the hydraulic fracturing fluid includes at least one surfactant, and the metal oxide catalyst nanoparticles and the hydraulic fracturing fluid being selected such that the metal oxide catalyst nanoparticles are dissolvable in the hydraulic fracturing fluid. The metal oxide catalyst nanoparticles are operable to dissolve in the hydraulic fracturing fluid, which results in an amount of carbon nanotubes dispersed within the hydraulic fracturing fluid. The carbon nanotube dispersion increases at least one of a Newtonian viscosity, a yield point, a plastic viscosity, and a density of the hydraulic fracturing fluid with the dispersed carbon nanotubes versus a similar or equivalent hydraulic fracturing fluid without the carbon nanotube dispersion. The method may then include adding proppants to the hydraulic fracturing fluid after the addition of the precursor nanoparticles. The carbon nanotubes in the hydraulic fracturing fluid aid in suspending the proppants in the hydraulic fracturing fluid such that more proppants remain suspended in the hydraulic fracturing fluid with the dispersed carbon nanotubes versus a similar or equivalent hydraulic fracturing fluid without the carbon nanotube dispersion.

Additional features and advantages of the described embodiments will be set forth in the detailed description which follows, and in part will be readily apparent to those skilled in the art from that description or recognized by practicing the described embodiments, including the detailed description which follows as well as the claims.

BRIEF DESCRIPTION OF THE DRAWINGS

The following detailed description of specific embodiments of the present disclosure may be best understood when read in conjunction with the following drawings, where like structures are indicated with like reference numerals and in which.

DETAILED DESCRIPTION

Figure 1:
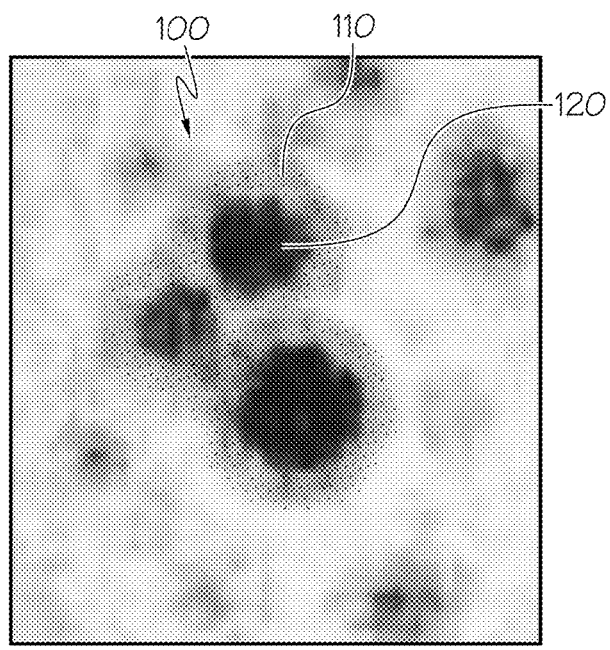
FIG. 1 photographically depicts metal oxide catalyst nanoparticles, according to one or more embodiments described in this disclosure.

As used throughout the disclosure, "aqueous" refers to a fluid containing, producing, resembling, or having the properties of water.

As used throughout this disclosure, the term "hydraulic fracturing fluid" refers to a subset of hydraulic fracturing fluids that is used to carry proppants into wellbores and subsurface formations.

As used throughout this disclosure, the term "hydraulic fracturing" refers to a stimulation treatment routinely performed on hydrocarbon wells in reservoirs with a permeability of less than 10 milliDarcys. Hydraulic fracturing fluids are pumped into a subsurface formation, causing a fracture to form or open. Proppants are mixed with the treatment fluid to keep the fracture open when the treatment is complete. Hydraulic fracturing creates fluid communication within a subsurface formation and bypasses damage, such as condensate banking, that may exist in the near-wellbore area.

As used throughout this disclosure, the term "lithostatic pressure" refers to the pressure of the weight of overburden, or overlying rock, on a subsurface formation.

As used throughout this disclosure, the term "Newtonian viscosity" refers to the apparent viscosity of a fluid measured at a given rotor speed of a rotational viscometer. The Newtonian viscosity may be measured by multiplying the dial reading of the viscometer by 300, and dividing that product by the rotor speed in revolutions per minute.

As used throughout this disclosure, the term "oleaginous" refers to a fluid containing, producing, resembling, or having the properties of oil.

As used throughout this disclosure, the term "producing subsurface formation" refers to the subsurface formation from which hydrocarbons are produced.

As used throughout this disclosure, the term "proppants" refers to particles mixed with hydraulic fracturing fluid to hold fractures open after a hydraulic fracturing treatment. Proppant materials are carefully sorted for mesh size, roundness and sphericity to provide an efficient conduit for fluid production from the reservoir to the wellbore.

As used throughout this disclosure, the term "reservoir" refers to a subsurface formation having sufficient porosity and permeability to store and transmit fluids.

As used throughout this disclosure, the term "subsurface formation" refers to a body of rock that is sufficiently distinctive and continuous from the surrounding rock bodies that the body of rock may be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "wings" refers to the two cracks formed by a fracture being 180° apart and typically similar in shape and size.

As used throughout this disclosure, the term "wellbore" refers to the drilled hole or borehole, including the open-hole or uncased portion of the well. Borehole may refer to the inside diameter of the wellbore wall, the rock face that bounds the drilled hole.

Embodiments of the present disclosure are directed to methods of suspending proppants in hydraulic fracturing fluids. The embodiments include, among other things, adding a quantity of precursor nanoparticles including carbon nanotubes supported by metal oxide catalyst nanoparticles to the hydraulic fracturing fluid. The metal oxide catalyst nanoparticles and the hydraulic fracturing fluid are selected such that the metal oxide catalyst nanoparticles are dissolvable in the hydraulic fracturing fluid. The metal oxide catalyst nanoparticles are operable to dissolve in the hydraulic fracturing fluid, which results in an amount of carbon nanotubes dispersed within the hydraulic fracturing fluid. The dispersion of the amount of carbon nanotubes increases the value of at least one of a Newtonian viscosity, a yield point, a plastic viscosity, and a density of the hydraulic fracturing fluid with the dispersed carbon nanotubes versus a similar or equivalent hydraulic fracturing fluid without the carbon nanotube dispersion. The method may further include adding proppants to the hydraulic fracturing fluid after the addition of the precursor nanoparticles. The carbon nanotubes in the hydraulic fracturing fluid aid in suspending the proppants in the hydraulic fracturing fluid such that more proppants remain suspended in the hydraulic fracturing fluid with the dispersed carbon nanotubes versus a similar or equivalent hydraulic fracturing fluid without the carbon nanotube dispersion.

In another embodiment, the method may include synthesizing carbon nanotubes via chemical vapor deposition on metal oxide catalyst nanoparticles to form a quantity of precursor nanoparticles, in which individual nanoparticles of the metal oxide catalyst nanoparticles include a transition metal disposed on a metal oxide, and adding the quantity of precursor nanoparticles to the hydraulic fracturing fluid, in which the hydraulic fracturing fluid includes at least one surfactant, and the metal oxide catalyst nanoparticles and the hydraulic fracturing fluid being selected such that the metal oxide catalyst nanoparticles are dissolvable in the hydraulic fracturing fluid. The metal oxide catalyst nanoparticles are operable to dissolve in the hydraulic fracturing fluid, which results in an amount of carbon nanotubes dispersed within the hydraulic fracturing fluid. The carbon nanotube dispersion increases at least one of a Newtonian viscosity, a yield point, a plastic viscosity, and a density of the hydraulic fracturing fluid with the dispersed carbon nanotubes versus a similar or equivalent hydraulic fracturing fluid without the carbon nanotube dispersion. The method may then include adding proppants to the hydraulic fracturing fluid after the addition of the precursor nanoparticles. The carbon nanotubes in the hydraulic fracturing fluid aid in suspending the proppants in the hydraulic fracturing fluid such that more proppants remain suspended in the hydraulic fracturing fluid with the dispersed carbon nanotubes versus a similar or equivalent hydraulic fracturing fluid without the carbon nanotube dispersion.

Other embodiments of the present disclosure include hydraulic fracturing fluids including carbon nanotubes and proppants. Further embodiments include methods of using the hydraulic fracturing fluids to methods for increasing a rate of hydrocarbon production from a subsurface formation through the use of the hydraulic fracturing fluid.

As a non-limiting example, the hydraulic fracturing fluids of the present disclosure may be used in the oil and gas drilling industries, such as for hydraulic fracturing treatments in oil and gas wells. Oil and gas wells may be formed in subterranean portions of the Earth, sometimes referred to as subterranean geological formations. The wellbore may serve to connect natural resources, such as petrochemical products, to a ground level surface. As time passes, the rate of production decreases, and a hydraulic fracturing treatment may be desired to increase the rate of production. In hydraulic fracturing, a hydraulic fracturing fluid including proppants is pumped into a subsurface formation to propagate fractures within a subsurface formation and further open existing fractures. The proppants keep the fracture open when the treatment is complete, thereby creating fluid communication within a subsurface formation and bypassing damage such as condensate banking or filter cake formation that may exist in the near-wellbore area.

To accomplish these functions, the hydraulic fracturing fluid may be formulated to have specific characteristics, such as increased values of Newtonian viscosity, yield point, plastic viscosity, and density of the hydraulic fracturing fluid with the dispersed carbon nanotubes versus a similar or equivalent hydraulic fracturing fluid without the carbon nanotube dispersion. In particular, the hydraulic fracturing fluid may be formulated to have a density in a range suitable to provide the necessary hydrostatic pressure to support the sidewalls of the wellbore and prevent fluids in the formation from flowing into the wellbore. Additionally, the hydraulic fracturing fluids may be formulated to have specific rheological properties that allow the hydraulic fracturing fluid to be pumped down through the drill string while still capturing and conveying proppants from the top of the wellbore to the subsurface formation. In some embodiments, the hydraulic fracturing fluids may include solid particles suspended in a base fluid. The solid particles, sometimes referred to as a weighting agent, may increase the density of the hydraulic fracturing fluid to help the hydraulic fracturing fluid support the sidewalls of the wellbore as well as increase the hydrostatic pressure to keep fluids from the formation from flowing into the wellbore. In other embodiments, the hydraulic fracturing fluids may be able to provide the necessary hydrostatic pressure without the use of solid particles to increase the density of the fluid. The hydraulic fracturing fluid may include water, a clay-based component, and proppants.

As stated previously, the hydraulic fracturing fluid includes carbon nanotubes. The carbon nanotubes include at least one of single-walled nanotubes, double-walled nanotubes, multi-walled nanotubes, or narrow-walled nanotubes. The carbon nanotubes may include a diameter of from 1 to 200 nanometers (nm), from 20 to 100 nm, from 10 to 80 nm, from 4 to 20 nm, from 2 to 12 nm, from 2 to 10 nm, from 2 to 9 nm, from 2 to 8 nm, from 2 to 7 nm, from 2 to 6 nm, from 2 to 5 nm, from 2 to 4 nm, from 2 to 3 nm, 3 to 12 nm, from 3 to 10 nm, from 3 to 9 nm, from 3 to 8 nm, from 3 to 7 nm, from 3 to 6 nm, from 3 to 5 nm, from 3 to 4 nm, 4 to 12 nm, from 4 to 10 nm, from 4 to 9 nm, from 4 to 8 nm, from 4 to 7 nm, from 4 to 6 nm, from 4 to 5 nm, 5 to 12 nm, from 5 to 10 nm, from 5 to 9 nm, from 5 to 8 nm, from 5 to 7 nm, from 5 to 6 nm, 6 to 12 nm, from 6 to 10 nm, from 6 to 9 nm, from 6 to 8 nm, from 6 to 7 nm, 7 to 12 nm, from 7 to 10 nm, from 7 to 9 nm, from 7 to 8 nm, 8 to 12 nm, from 8 to 10 nm, from 8 to 9 nm, 9 to 12 nm, from 9 to 10 nm, from 10 to 12 nm, or of 8 nm.

The carbon nanotubes may include a length of from 20 to 500 microns (μm), 20 to 200 μm, 20 to 150 μm, 20 to 100 μm, 50 to 500 μm, from 50 to 200 μm, from 50 to 150 μm, from 50 to 100 μm, from 100 to 500 μm, from 100 to 200 μm, from 100 to 150 μm, from 150 to 500 μm, from 150 to 200 μm, or from 200 to 500 μm; an aspect ratio (calculated by dividing the length of the carbon nanotube by the diameter of the carbon nanotube) of from 100 to 50,000, from 500 to 30,000, from 1,000 to 20,000, from 1,000 to 100,000, from 1,000 to 50,000, from 1,000 to 40,000, from 1,000 to 30,000, from 1,000 to 25,000, from 1,000 to 20,000, from 1,000 to 15,000, from 1,000 to 12,000, from 1,000 to 10,000, from 1,000 to 8,000, from 8,000 to 100,000, from 8,000 to 50,000, from 8,000 to 40,000, from 8,000 to 30,000, from 8,000 to 25,000, from 8,000 to 20,000, from 8,000 to 15,000, from 8,000 to 12,000, from 8,000 to 10,000, from 10,000 to 100,000, from 10,000 to 50,000, from 10,000 to 40,000, from 10,000 to 30,000, from 10,000 to 25,000, from 10,000 to 20,000, from 10,000 to 15,000, from 10,000 to 12,000, from 12,000 to 100,000, from 12,000 to 50,000, from 12,000 to 40,000, from 12,000 to 30,000, from 12,000 to 25,000, from 12,000 to 20,000, from 12,000 to 15,000, from 15,000 to 100,000, from 15,000 to 50,000, from 15,000 to 40,000, from 15,000 to 30,000, from 15,000 to 25,000, from 15,000 to 20,000, from 20,000 to 100,000, from 20,000 to 50,000, from 20,000 to 40,000, from 20,000 to 30,000, from 20,000 to 25,000, from 25,000 to 100,000, from 25,000 to 50,000, from 25,000 to 40,000, from 25,000 to 30,000, from 30,000 to 100,000, from 30,000 to 50,000, from 30,000 to 40,000, from 40,000 to 50,000, from 40,000 to 100,000, or from 50,000 to 100,000.

The carbon nanotubes may include a specific surface area of from 100 to 12,000 square meter per gram ($m^2/g$), from 100 to 10,000 $m^2/g$, from 100 to 800 $m^2/g$, from 100 to 700 $m^2/g$, from 400 to 12,000 $m^2/g$, from 400 to 10,000 $m^2/g$, from 400 to 800 $m^2/g$, from 100 to 1,500 $m^2/g$, from 120 to 1,000 $m^2/g$, from 150 to 850 $m^2/g$, or from 400 to 700 $m^2/g$, where the specific surface area is calculated through the Brunauer-Emmett-Teller (BET) theory.

The carbon nanotubes may include a metal oxide percentage of 10 weight percent (wt. %) or less, 5 wt. % or less, 3 wt. % or less, 2 wt. % or less, 1.5 wt. % or less, 1 wt. % or less, or 0.5 wt. % or less; and a bulk density of from 0.001 to 0.12 $g/cm^3$, from 0.01 to 0.08 $g/cm^3$, from 0.02 to 0.06 $g/cm^3$, from 0.01 to 1 grams per cubic centimeter ($g/cm^3$), from 0.01 to 0.5 $g/cm^3$, from 0.01 to 0.2 $g/cm^3$, from 0.01 to 0.1 $g/cm^3$, from 0.01 to 0.05 $g/cm^3$, from 0.01 to 0.02 $g/cm^3$, from 0.02 to 1 $g/cm^3$, from 0.02 to 0.5 $g/cm^3$, from 0.02 to 0.2 g/cm³, from 0.02 to 0.1 g/cm³, from 0.02 to 0.05 g/cm³, from 0.05 to 1 g/cm³, from 0.05 to 0.5 g/cm³, from 0.05 to 0.2 g/cm³, from 0.05 to 0.1 g/cm³, from 0.06 to 0.08 g/cm³, from 0.1 to 1 g/cm³, 0.1 to 0.5 g/cm³, from 0.1 to 0.2 g/cm³, from 0.2 to 1 g/cm³, from 0.2 to 0.5 g/cm³, or from 0.5 to 1 g/cm³.

As stated previously, the hydraulic fracturing fluid further includes proppants. As previously described, proppants are propping agent particles used in hydraulic fracturing fluids to maintain and hold open subsurface fractures during or following subsurface treatment. In some embodiments, the proppants may include particles of materials such as oxides, silicates, sand, ceramic, resin, epoxy, plastic, mineral, glass, or combinations of these. The proppant particle may include graded sand, treated sand, ceramic, glass, plastic, any combination of these, and any of these materials coated with resin. The proppant particle may include particles of bauxite, sintered bauxite, $Ti^{4+}$/polymer composites, where the superscript "4+" stands for the oxidation state of titanium, titanium nitride (TiN), or titanium carbide. The proppant particle may include glass particles or glass beads. Embodiments of the present disclosure may utilize at least one proppant particle and in embodiments in which more than one proppant particle is used, the proppant particles may contain a combination of different materials.

The material of the proppant particle may be chosen based on the particular application and characteristics desired, such as the depth of the subsurface formation in which the proppant particles will be used, as proppant particles with a greater mechanical strength are needed at greater lithostatic pressures.

The proppant particle may include various sizes or shapes. In some embodiments, the one or more proppant particles may have sizes from 8 mesh to 140 mesh (diameters from 106 micrometers (μm) to 2.36 millimeters (mm)). In some embodiments, the proppant particles may have sizes from 8 mesh to 16 mesh (diam. 2380 μm to 1180 μm), 16 mesh to 30 mesh (diam. 600 μm to 1180 μm), 20 mesh to 40 mesh (diam. 420 μm to 840 μm), 30 mesh to 50 mesh (diam. 300 μm to 600 μm), 40 mesh to 70 mesh (diam. 212 μm to 420 μm) or 70 mesh to 140 mesh (diam. 106 μm to 212 μm). The sphericity and roundness of the proppant particles may also vary based on the desired application.

In some embodiments, the proppant particles may have a rough surface texture that may increase adhesion of a proppant coating to the proppant particle. The proppant particles surfaces may be roughened to increase the surface area of the proppant particle by any suitable physical or chemical method, including, for example, using an appropriate etchant. In some embodiments, the proppant particle may have a surface that provides a desired adherence of a proppant coating to the proppant particle or may already be sufficiently rough without a need for chemical or physical roughening. Specifically, ball milling proppant particles may provide relatively rounder particles as well as particles with increased surface roughness.

The term "rough" refers to a surface having at least one deviation from the normalized plane of the surface, such as a depression or protrusion. The surface may be uneven and irregular and may have one or more imperfections, such as dimples, stipples, bumps, or projections. The rough surface may have an arithmetic average roughness ($R_a$) of greater than or equal to 1 nanometer (nm) (1 nm=0.001 μm). $R_a$ is defined as the arithmetic average of the differences between the local surface heights and the average surface height and may be described by Equation 1, contemplating n measurements:

$$R_a = \frac{1}{n}\sum_{i=1}^{n}|y_i| \quad \text{EQUATION 1}$$

In Equation 1, each $y_i$ is the amount of deviation from the normalized plane of the surface (meaning the depth or height of a depression or protrusion, respectively) of the absolute value of the ith of n measurements. Thus, $R_a$ is the arithmetic average of the absolute values of n measurements of deviation y from the normalized plane of the surface. In some embodiments, the surface of the proppant particle may have an $R_a$ of greater than or equal to 2 nm (0.002 μm), or greater than or equal to 10 nm (0.01 μm), or greater than or equal to 50 nm (0.05 μm), or greater than or equal to 100 nm (0.1 μm), or greater than or equal to 1 μm.

The hydraulic fracturing fluid may include a clay-based component. The clay-based component may include one or more components selected from the group consisting of lime (CaO), $CaCO_3$, bentonite, montmorillonite clay, barium sulfate (barite), hematite ($Fe_2O_3$), mullite ($3Al_2O_3 \cdot 2SiO_2$ or $2Al_2O_3 \cdot SiO_2$), kaolin, ($Al_2Si_2O_5(OH)_4$ or kaolinite), alumina ($Al_2O_3$, or aluminum oxide), silicon carbide, tungsten carbide, and combinations of these.

The hydraulic fracturing fluid may include an aqueous phase. The aqueous phase may include at least one of fresh water, salt water, brine, municipal water, formation water, produced water, well water, filtered water, distilled water, sea water, or combinations of these. The brine may include at least one of natural and synthetic brine, such as saturated brine or formate brine. The aqueous phase may use water containing organic compounds or salt. Without being bound by any particular theory, salt or other organic compounds may be incorporated into the aqueous phase to control the density of the hydraulic fracturing fluid. Increasing the saturation of the aqueous phase by increasing the salt concentration or the level of other organic compounds in the aqueous phase may increase the density of the hydraulic fracturing fluid. Suitable salts include but are not limited to alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides and combinations of these. In some particular embodiments, brine may be used in the aqueous phase. Without being bound by any particular theory, brine may be used to create osmotic balance between the hydraulic fracturing fluid and the subterranean formation.

In some embodiments, the hydraulic fracturing fluid may contain from 10 weight percent (wt. %) to 70 wt. % of the aqueous phase based on the total weight of the hydraulic fracturing fluid. In some embodiments, the hydraulic fracturing fluid may contain from 28 pounds per barrel (lb/bbl) to 630 lb/bbl, such as from 30 to 600 lb/bbl, from 50 to 500 lb/bbl, from 100 to 500 lb/bbl, 200 to 500 lb/bbl, or 300 to 600 lb/bbl of the aqueous phase.

The hydraulic fracturing fluid may be nonaqueous. In some embodiments, the hydraulic fracturing fluid may include an oleaginous phase, which may include natural or synthetic liquid oil. Specifically, the hydraulic fracturing fluid may include diesel oil, mineral oil, hydrogenated or unhydrogenated olefins such as poly-alpha olefins, linear and branched olefins, poly-diorganosiloxanes, siloxanes, organosiloxanes, esters of fatty acids, straight chain, branched or cyclical alkyl ethers of fatty acids, esters, ethers, acetals, dialkylcarbonates, hydrocarbons or combinations of any of these. In some embodiments, the hydraulic fracturing fluid may include oils derived from petroleum, such as mineral oils, diesel oils, linear olefins, paraffin, and combinations of these oils or oils derived from plants, such as safra oil, for example.

The hydraulic fracturing fluid may contain from 10 wt. % to 90 wt. % of the oleaginous phase based on the total weight of the hydraulic fracturing fluid. The hydraulic fracturing fluid may contain from 28 lb/bbl to 810 lb/bbl of the oleaginous phase based on the total weight of the hydraulic fracturing fluid, such as from 30 to 800 lb/bbl, from 50 to 800 lb/bbl, from 75 to 800 lb/bbl, or from 100 to 800 lb/bbl. In some embodiments, the hydraulic fracturing fluid may contain from 200 to 800 lb/bbl, or 300 to 600 lb/bbl, or 500 to 810 lb/bbl of the oleaginous phase.

The hydraulic fracturing fluid may include a polar aprotic solvent. In some embodiments, the polar aprotic solvent may partially or fully replace the aqueous phase of the hydraulic fracturing fluid. A polar aprotic solvent polar lacks an acidic hydrogen, and therefore is not a hydrogen bond donor, meaning that it cannot donate a hydrogen. Polar aprotic solvents may dissolve salts and may be capable of accepting hydrogen bonds. Polar aprotic solvents may have a dielectric constant, or relative permittivity, of greater than 10, 15, 20, 25, 30, 35, or 40. Polar aprotic solvents may have a dielectric constant, or relative permittivity, of less than 15, 20, 25, 30, 35, 40, 50, 60, or 70. Polar aprotic solvents may also have a dipole moment of greater than 1 debye (1 debye=$1\times10^{-18}$ statcoulomb-centimeter), 2 debyes, 3 debyes, 3.5 debyes, 4 debyes, 4.5 debyes, or 5 debyes. Polar aprotic solvents may have a dipole moment of less 2 debyes, 3 debyes, 3.5 debyes, 4 debyes, 4.5 debyes, 5 debyes, 6 debyes, 7 debyes, 8 debyes, 9 debyes, or 10 debyes. The polar aprotic solvent may include at least one of n-alkyl pyrrolidone, dimethylformamide, dimethylsulfonide, acetonitrile, dimethylformamide, hexamethylphosphoramide, or dimethyl sulfoxide.

The hydraulic fracturing fluid may include at least one surfactant. The surfactant may maintain the dispersion of the carbon nanotubes within the hydraulic fracturing fluid. The surfactant may be anionic, cationic, or neutral. Non-limiting examples of anionic surfactants include sulfonated polymers, sulfonated alkanes, polycarboxylated ethers, or combinations of these. Non-limiting examples of cationic surfactants include trimethylalkylammonium salts, alkylbenxylammonium salts, or combinations of these. Non-limiting examples of neutral surfactants include proteins, polyethylene glycol derivatives, oligosaccharides, cholesterol derivatives, or combinations of these. The surfactant may include at least one of sulfonated polymers, sulfonated alkanes, polycarboxylated ethers, trimethylalkylammonium salts, alkylbenzylammonium salts, proteins, polyethylene glycol derivatives, oligosaccharides, or cholesterol derivatives. The hydraulic fracturing fluid may contain from 0.01 wt. % to 20 wt. % of the surfactant based on the total weight of the hydraulic fracturing fluid. The hydraulic fracturing fluid may contain from 0.02 lb/bbl to 180 lb/bbl of the surfactant based on the total weight of the hydraulic fracturing fluid, such as from 0.02 to 150 lb/bbl, or from 0.05 to 150 lb/bbl. In some embodiments, the hydraulic fracturing fluid may contain from 0.1 to 150 lb/bbl, or from 0.1 to 100 lb/bbl, or from 1 to 100 lb/bbl of the surfactant.

In some embodiments, the hydraulic fracturing fluid may contain at least one additive other than the surfactant. The one or more additives may be any additives known to be suitable for hydraulic fracturing fluids. As non-limiting examples, suitable additives may include weighting agents, fluid loss control agents, lost circulation control agents, filtration control additives, antifoaming agents, emulsifiers, weighting agent, fluid loss additives, an alkali reserve, specialty additives, and combinations of these.

In some embodiments, the one or more additives may include an additional viscosifier, also referred to as a rheology modifier, which may be added to the hydraulic fracturing fluid to impart non-Newtonian fluid rheology to the hydraulic fracturing fluid to facilitate conveying proppants to the subsurface formation. Examples of viscosifiers may include, but are not limited to bentonite, polyacrylamide, polyanionic cellulose, or combinations of these viscosifiers. In some embodiments, the hydraulic fracturing fluid may include xanthan gum, a polysaccharide commonly referred to XC polymer. The XC polymer may be added to the water-based hydraulic fracturing fluid to produce a flat velocity profile of the water-based hydraulic fracturing fluid in annular flow, which may help to improve the efficiency of the hydraulic fracturing fluid in lifting and conveying rock cuttings to the surface.

In some embodiments, the hydraulic fracturing fluid may contain from 0.01 wt. % to 20 wt. % of the one or more additives based on the total weight of the hydraulic fracturing fluid. The hydraulic fracturing fluid may contain from 0.02 lb/bbl to 180 lb/bbl of the one or more additives based on the total weight of the hydraulic fracturing fluid, such as from 0.02 to 150 lb/bbl, or from 0.05 to 150 lb/bbl. In some embodiments, the hydraulic fracturing fluid may contain from 0.1 to 150 lb/bbl, or from 0.1 to 100 lb/bbl, or from 1 to 100 lb/bbl of the one or more additives.

In some embodiments, the one or more additives may include solids, sometimes referred to as weighting material, which may be dispersed in the hydraulic fracturing fluid. The solids may be finely divided solids that may be added to the hydraulic fracturing fluid to increase the density of the hydraulic fracturing fluid. Examples of weighting materials suitable for use as the solid include, but are not limited to, barite (minimum specific gravity (SG) of 4.20 grams per centimeter cubed ($g/cm^3$)), hematite (minimum SG of 5.05 $g/cm^3$), calcium carbonate (minimum SG of 2.7-2.8 $g/cm^3$), siderite (minimum SG of 3.8 $g/cm^3$), ilmenite (minimum SG of 4.6 $g/cm^3$), or any combination of these weighting materials. In some embodiments, the hydraulic fracturing fluid may include barite as the solid.

In embodiments, the hydraulic fracturing fluid may have a solids content of from 1 wt. % to 40 wt. % based on the weight of the solid weighting material based on the total weight of the hydraulic fracturing fluid. The hydraulic fracturing fluid may have a solids content of from 2.5 lb/bbl to 400 lb/bbl, such as from 2.5 to 200 lb/bbl, or 2.5 to 100 lb/bbl. In some embodiments, the hydraulic fracturing fluid may have a solids content of from 5 to 400 lb/bbl, from 50 to 400 lb/bbl, or from 100 to 200 lb/bbl.

As stated, the addition of solids may be used to control the density of the hydraulic fracturing fluid. In some embodiments, the hydraulic fracturing fluid may have a density of from 50 pounds of mass per cubic foot (pcf) to 160 pcf, as measured using a mud balance in accordance with the American Petroleum Institute (API) recommended practice 13B-2, 2014. The hydraulic fracturing fluid may have a density of from 50 pcf to 150 pcf, from 50 pcf to 140 pcf, from 75 pcf to 160 pcf, from 75 pcf to 150 pcf, from 75 pcf to 140 pcf, from 100 pcf to 160 pcf, from 100 pcf to 150 pcf, or from 100 pcf to 140 pcf. In some embodiments, the hydraulic fracturing fluid may have a density of from 50 pcf to 75 pcf, or from 75 pcf to 100 pcf, or from 120 pcf to 160 pcf.

Embodiments of the disclosure further relate to methods of suspending proppants in a hydraulic fracturing fluid. The resulting hydraulic fracturing fluid may be in accordance with any of the embodiments previously described. The method may involve adding a quantity of precursor nanoparticles including carbon nanotubes supported by metal oxide catalyst nanoparticles to the hydraulic fracturing fluid. The metal oxide catalyst nanoparticles and the hydraulic fracturing fluid are selected such that the metal oxide catalyst nanoparticles are dissolvable in the hydraulic fracturing fluid. The metal oxide catalyst nanoparticles are operable to dissolve in the hydraulic fracturing fluid, which results in an amount of carbon nanotubes dispersed within the hydraulic fracturing fluid. The dispersion of the amount of carbon nanotubes increases the value of at least one of a Newtonian viscosity, a yield point, a plastic viscosity, and a density of the hydraulic fracturing fluid with the dispersed carbon nanotubes versus a similar or equivalent hydraulic fracturing fluid without the carbon nanotube dispersion. The method may further include adding proppants to the hydraulic fracturing fluid after the addition of the precursor nanoparticles. The carbon nanotubes in the hydraulic fracturing fluid aid in suspending the proppants in the hydraulic fracturing fluid such that more proppants remain suspended in the hydraulic fracturing fluid with the dispersed carbon nanotubes versus a similar or equivalent hydraulic fracturing fluid without the carbon nanotube dispersion. The hydraulic fracturing fluid, carbon nanotubes, and proppants may be in accordance with any of the embodiments previously described.

Referring to FIG. 1, individual nanoparticles of the metal oxide catalyst nanoparticles 100 may include a metal oxide 120 and a transition metal 110. The transition metal 110 may include iron (Fe), cobalt (Co), or nickel (Ni). In other embodiments, the transition metal 110 may include at least one of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium, ununbium, or combinations of these.

The individual nanoparticles of the metal oxide catalyst nanoparticles 100 may include 10 wt. % or less transition metal 110 as calculated by a weight of the metal oxide 120. In other embodiments, the individual nanoparticles of the metal oxide catalyst nanoparticles 100 may include from 0 to 10 wt. %, from 1 to 10 wt. %, from 2 to 10 wt. %, from 3 to 10 wt. %, from 4 to 10 wt. %, from 5 to 10 wt. %, from 6 to 10 wt. %, from 7 to 10 wt. %, from 8 to 10 wt. %, from 9 to 10 wt. %, from 1 to 9 wt. %, from 2 to 9 wt. %, from 3 to 9 wt. %, from 4 to 9 wt. %, from 5 to 9 wt. %, from 6 to 9 wt. %, from 7 to 9 wt. %, from 8 to 9 wt. %, from 1 to 8 wt. %, from 2 to 8 wt. %, from 3 to 8 wt. %, from 4 to 8 wt. %, from 5 to 8 wt. %, from 6 to 8 wt. %, from 7 to 8 wt. %, from 1 to 7 wt. %, from 2 to 7 wt. %, from 3 to 7 wt. %, from 4 to 7 wt. %, from 5 to 7 wt. %, from 6 to 7 wt. %, from 1 to 6 wt. %, from 2 to 6 wt. %, from 3 to 6 wt. %, from 4 to 6 wt. %, from 5 to 6 wt. %, from 1 to 5 wt. %, from 2 to 5 wt. %, from 3 to 5 wt. %, from 4 to 5 wt. %, from 1 to 4 wt. %, from 2 to 4 wt. %, from 3 to 4 wt. %, from 1 to 3 wt. %, from 2 to 3 wt. %, from 1 to 2 wt. %, or from 0 to 1 wt. % transition metal 110 as calculated by a weight of the metal oxide 120.

The metal oxide 120 may include at least one of lithium oxide, sodium oxide, potassium oxide, rubidium oxide, magnesium oxide (MgO), calcium oxide (CaO), beryllium oxide, strontium oxide, barium oxide, radium oxide, scandium oxide, yttrium oxide, titanium oxide, zirconium oxide, vanadium oxide, niobium oxide, chromium oxide, molybdenum oxide, manganese oxide, technetium oxide, iron oxide, ruthenium oxide, cobalt oxide, rhodium oxide, nickel oxide, palladium oxide, copper oxide, silver oxide, gold oxide, platinum oxide, zinc oxide, cadmium oxide, mercury oxide, aluminum oxide, gallium oxide, indium oxide, tin oxide, thallium oxide, lead oxide, boron oxide, silicon oxide, or combinations of these. The metal oxide 120 may be a conventional hydraulic fracturing fluid additive. The metal oxide 120 may be a chemical conventionally used as buffers in hydraulic fracturing fluids. The metal oxide 120 may be a chemical conventionally used to increase the pH of hydraulic fracturing fluids. The metal oxide 120 may be alkaline, and may have a pH of greater than 7, of from 8 to 14, of from 9 to 14, of from 10 to 14, of from 11 to 14, of from 11.5 to 14, of from 12 to 14, of from 12.5 to 14, of from 13 to 14, of from 8 to 13, of from 9 to 13, of from 10 to 13, of from 11 to 13, of from 11.5 to 13, of from 12 to 13, of from 12.5 to 13, of from 8 to 12.5, of from 9 to 12.5, of from 10 to 12.5, of from 11 to 12.5, of from 11.5 to 12.5, of from 12 to 12.5, of from 8 to 12, of from 9 to 12, of from 10 to 12, of from 11 to 12, of from 11.5 to 12, of from 8 to 11.5, of from 9 to 11.5, of from 10 to 11.5, of from 11 to 11.5, of from 8 to 11, of from 9 to 11, of from 10 to 11, of from 8 to 10, of from 9 to 10, of from 8 to 9, or of 12.8. The metal oxide 120 may have a $pK_a$ value of from 10 to 15, of from 11 to 14, of from 12 to 13, or of 12.8. In some embodiments, the metal oxide 120 may include MgO or CaO. CaO may have a $pK_a$ value of from 10 to 15, of from 11 to 14, of from 12 to 13, or of 12.8.

The transition metal 110 may be disposed on the metal oxide 120 of the metal oxide catalyst nanoparticles 100, as shown. Specifically, in some embodiments, the metal oxide catalyst nanoparticles 100 may further include at least one of Fe, Co, or Ni disposed on the MgO or CaO metal oxides 120.

In some embodiments, the method includes synthesizing carbon nanotubes via chemical vapor deposition on metal oxide catalyst nanoparticles to form a quantity of precursor nanoparticles, in which individual nanoparticles of the metal oxide catalyst nanoparticles include a transition metal disposed on a metal oxide, and adding the quantity of precursor nanoparticles to the hydraulic fracturing fluid, in which the hydraulic fracturing fluid includes at least one surfactant, and the metal oxide catalyst nanoparticles and the hydraulic fracturing fluid being selected such that the metal oxide catalyst nanoparticles are dissolvable in the hydraulic fracturing fluid. The metal oxide catalyst nanoparticles are operable to dissolve in the hydraulic fracturing fluid, which results in an amount of carbon nanotubes dispersed within the hydraulic fracturing fluid. The carbon nanotube dispersion increases at least one of a Newtonian viscosity, a yield point, a plastic viscosity, and a density of the hydraulic fracturing fluid with the dispersed carbon nanotubes versus a similar or equivalent hydraulic fracturing fluid without the carbon nanotube dispersion. The method may then include adding proppants to the hydraulic fracturing fluid after the addition of the precursor nanoparticles. The carbon nanotubes in the hydraulic fracturing fluid aid in suspending the proppants in the hydraulic fracturing fluid such that more proppants remain suspended in the hydraulic fracturing fluid with the dispersed carbon nanotubes versus a similar or equivalent hydraulic fracturing fluid without the carbon nanotube dispersion.

In one embodiment, synthesizing carbon nanotubes via chemical vapor deposition on metal oxide catalyst nanoparticles to form a quantity of precursor nanoparticles may include mixing an aqueous solution including the transition metal with an aqueous suspension of the metal oxide to form a mixture. In some embodiments, the aqueous suspension may include from 5 to 50 wt. %, from 5 to 30 wt. %, from 5 to 25 wt. %, from 5 to 20 wt. %, from 5 to 15 wt. %, from 5 to 10 wt. %, from 10 to 50 wt. %, from 10 to 30 wt. %, from 10 to 25 wt. %, from 10 to 20 wt. %, from 10 to 15 wt. %, from 15 to 50 wt. %, from 15 to 30 wt. %, from 15 to 25 wt. %, from 15 to 20 wt. %, from 20 to 50 wt. %, from 20 to 30 wt. %, from 20 to 25 wt. %, from 25 to 50 wt. %, from 25 to 30 wt. %, from 30 to 50 wt. % metal oxide as calculated by a weight of the aqueous suspension. Synthesizing the carbon nanotubes may then include stirring the mixture, drying the mixture at room temperature, and then grinding the mixture into a powder to form the metal oxide catalyst nanoparticles.

In an alternate embodiment, synthesizing carbon nanotubes via chemical vapor deposition on metal oxide catalyst nanoparticles to form a quantity of precursor nanoparticles may include mixing an aqueous solution including the transition metal with a powder including the metal oxide to form a mixture. Synthesizing the carbon nanotubes may then include stirring the mixture and calcining the mixture at from 100° C. to 500° C., from 200° C. to 500° C., from 300° C. to 500° C., from 200° C. to 400° C., or from 300° C. to 400° C. for from 5 to 15 hours, from 5 to 12 hours, from 5 to 10 hours, from 5 to 8 hours, from 8 to 15 hours, from 8 to 12 hours, from 8 to 10 hours, from 10 to 15 hours, from 10 to 12 hours, or from 12 to 15 hours. Synthesizing the carbon nanotubes may then include grinding the mixture into a powder to form the metal oxide catalyst nanoparticles.

Synthesizing the carbon nanotubes may further include heating the metal oxide catalyst nanoparticles to from 300° C. to 1400° C., from 300° C. to 1100° C., from 300° C. to 900° C., from 300° C. to 800° C., from 300° C. to 700° C., from 300° C. to 600° C., from 600° C. to 700° C., from 600° C. to 800° C., from 600° C. to 900° C., from 600° C. to 1100° C., from 600° C. to 1400° C., from 700° C. to 800° C., from 700° C. to 900° C., from 700° C. to 1100° C., from 700° C. to 1400° C., from 800° C. to 900° C., from 800° C. to 1100° C., from 800° C. to 1400° C., from 900° C. to 1100° C., from 900° C. to 1400° C., or from 1100° C. to 1400° C. In some embodiments, heating the carbon nanotubes may include placing the metal oxide catalyst nanoparticles into an oven or a reactor. In some embodiments, synthesizing the carbon nanotubes may include placing carbon precursors in the oven, which vaporize as the oven heats, to form a quantity of precursor nanoparticles including carbon nanotubes and metal oxide catalyst nanoparticles. In other embodiments, synthesizing the carbon nanotubes may include flowing a gas mixture over the metal oxide catalyst nanoparticles to form a quantity of precursor nanoparticles including carbon nanotubes and metal oxide catalyst nanoparticles. In some embodiments, the gas mixture may include argon, hydrogen, benzene, methylnaphthalene, ethylene, propylene, butylene, toluene, xylene, graphite, acetylene, ethanol, methane, carbon monoxide, carbon dioxide, hydrocarbon gases, any other gas containing carbon, and combinations of these. The term "hydrocarbon gas" refers to a compound consisting of hydrogen and carbon atoms in a gas phase at standard temperature and pressure. Non-limiting examples of hydrocarbon gas are paraffinic hydrocarbons and alkylaromatic hydrocarbons. The phrase "other gases that contain carbon" means that the gas is a gas other than a hydrocarbon gas, in which the gas comprises compounds that include carbon atoms. In one embodiment, the gas mixture may include argon, hydrogen, and ethylene.

In some embodiments, heating the metal oxide catalyst nanoparticles includes flowing a gas mixture over the metal oxide catalyst nanoparticles with a heating rate of from 1° C. per minute (° C./min.) to 20° C./min., from 3° C./min. to 10° C./min., from 5° C./min. to 10° C./min., from 5° C./min. to 7° C./min., or of 5° C./min. until the metal oxide catalyst nanoparticles are heated to from 300° C. to 1400° C., from 300° C. to 1100° C., from 300° C. to 900° C., from 300° C. to 800° C., from 300° C. to 700° C., from 300° C. to 600° C., from 600° C. to 700° C., from 600° C. to 800° C., from 600° C. to 900° C., from 600° C. to 1100° C., from 600° C. to 1400° C., from 700° C. to 800° C., from 700° C. to 900° C., from 700° C. to 1100° C., from 700° C. to 1400° C., from 800° C. to 900° C., from 800° C. to 1100° C., from 800° C. to 1400° C., from 900° C. to 1100° C., from 900° C. to 1400° C., or from 1100° C. to 1400° C. Heating the metal oxide catalyst nanoparticles may further include adding from 0 to 50 volume percent (vol. %), from 2 to 30 vol. %, from 2 to 20 vol. %, from 2 to 15 vol. %, from 2 to 10 vol. %, from 2 to 5 vol. %, from 5 to 30 vol. %, from 5 to 20 vol. %, from 5 to 15 vol. %, from 5 to 10 vol. %, from 10 to 30 vol. %, from 10 to 20 vol. %, from 10 to 15 vol. %, from 15 to 30 vol. %, from 15 to 20 vol. %, or from 20 to 30 vol. % carbon-based gas, as calculated by a volume of the gas mixture, to the gas mixture and flowing the gas mixture over the metal oxide catalyst nanoparticles to form a quantity of precursor nanoparticles including carbon nanotubes and metal oxide catalyst nanoparticles. The carbon-based gas may include any gas that includes carbon, such as, as non-limiting examples, carbon dioxide or hydrocarbon gases. In some embodiments, the carbon-based gas may be ethylene. The gas mixture including argon, hydrogen, and ethylene may include from 20 to 50 vol. %, from 20 to 40 vol. %, from 20 to 35 vol. %, from 20 to 30 vol. %, from 30 to 50 vol. %, from 30 to 40 vol. %, from 30 to 35 vol. %, from 35 to 40 vol. %, from 35 to 50 vol. %, or from 40 to 50 vol. % hydrogen, as calculated by a volume of the gas mixture, and from 50 to 80 vol. %, from 50 to 70 vol. %, from 50 to 65 vol. %, from 50 to 60 vol. %, from 60 to 65 vol. %, from 60 to 70 vol. %, from 60 to 80 vol. %, from 65 to 80 vol. %, from 65 to 70 vol. %, or from 70 to 80 vol. % argon, as calculated by a volume of the gas mixture. Flowing the gas mixture may include flowing the gas mixture at a rate of from 400 to 1000 milliliter per minute (ml/min.), from 500 to 800 ml/min., from 600 to 800 ml/min., or at 700 ml/min.

When the gas mixture contacts the metal oxide catalyst nanoparticles, the gas may decompose into carbon that dissolves into the metal oxide catalyst nanoparticles. After reaching the carbon-solubility limit in the metal oxide catalyst nanoparticles, the carbon may precipitate on the surface of the metal oxide catalyst nanoparticle and crystallize in the form of a cylindrical network, forming a carbon nanotube. In some embodiments, the gas mixture may contact the transition metal and decompose into carbon that dissolves into the transition metal. After reaching the carbon-solubility limit in the transition metal, the carbon may precipitate on the surface of the transition metal and crystallize in the form of a cylindrical network, forming a carbon nanotube. As stated previously, the carbon nanotubes are supported by the metal oxide catalyst nanoparticles. The carbon nanotubes being supported by the metal oxide catalyst nanoparticles may include carbon nanotubes adsorbed onto a surface of the metal oxide catalyst nanoparticles. In some embodiments, the carbon nanotubes being supported by the metal oxide catalyst nanoparticles may include carbon nanotubes bonded to a surface of the metal oxide catalyst nanoparticles.

Figure 2:
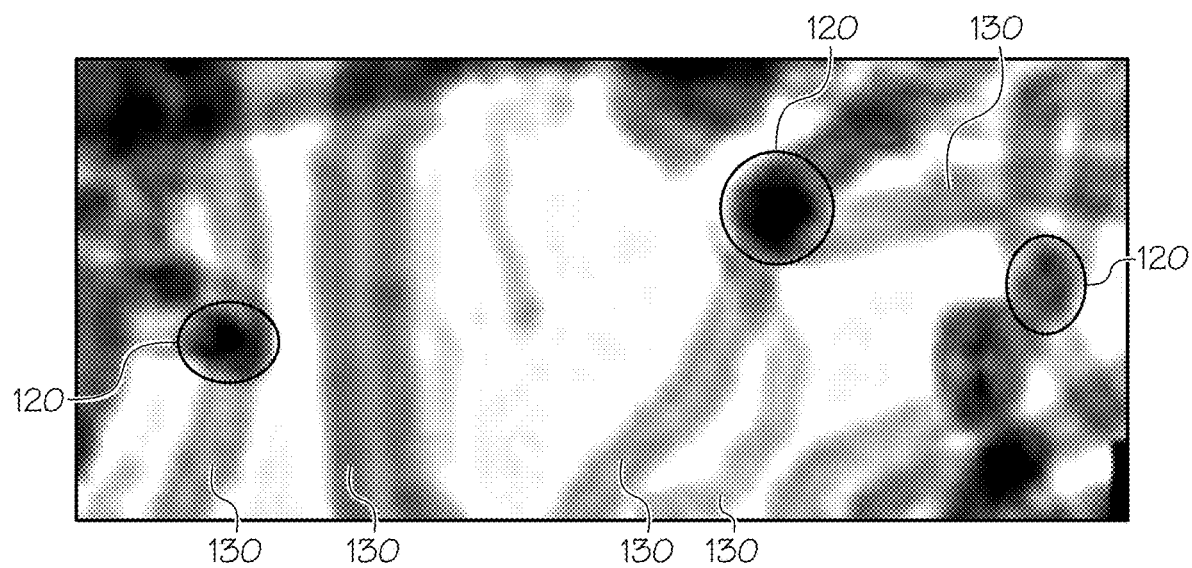
FIG. 2 photographically depicts carbon nanotubes adsorbed onto metal oxides, according to one or more embodiments described in this disclosure.

Synthesizing the carbon nanotubes via chemical vapor deposition on metal oxide catalyst nanoparticles may include diffusing carbon atoms through the carbon nanotubes. This is conventionally referred to as "tip growth." When the transition metal-metal oxide interaction is weak (when the transition metal has an acute contact angle with the metal oxide), carbon decomposes on the top surface of the transition metal and diffuses through the transition metal. This causes the carbon nanotube to precipitate between the transition metal and the metal oxide, to continue to grow between the transition metal and the metal oxide, and to push the transition metal off the metal oxide. Once the transition metal is fully covered with excess carbon, its catalytic activity ceases and the carbon nanotube ceases to grow. FIG. 2 photographically represents carbon nanotubes 130 grown via tip growth. The carbon nanotubes 130 are shown adsorbed onto the metal oxide 120.

In another embodiment, synthesizing carbon nanotubes via chemical vapor deposition on metal oxide catalyst nanoparticles includes diffusing carbon atoms along a surface of individual nanoparticles of the metal oxide catalyst nanoparticles. This is conventionally referred to as "base growth." When the transition metal-metal oxide interaction is strong (when the transition metal has an obtuse contact angle with the metal oxide) the initial carbon decomposition and diffusion takes place similarly to that in tip growth. However, as the carbon nanotube precipitates, the carbon nanotube precipitation fails to push the transition metal off the metal oxide. This forces the carbon nanotube to grow from the apex of the transition metal. The apex of the transition metal is the point on the transition metal farthest from the metal oxide. The carbon crystallizes initially as a hemispherical dome. Then, as the carbon continues to crystallize, it grows in the form of cylinder, forming a carbon nanotube. Unlike in tip growth, where the carbon nanotube grows from the tip (or from the top down), the carbon nanotube grows from the base (or from the bottom up) in base growth. Base growth occurs when the transition metal continues to be disposed on the metal oxide. Subsequent hydrocarbon decomposition takes place on the peripheral surface of the transition metal and as-dissolved carbon diffuses upward.

In some embodiments, the method may further include synthesizing silicon carbide nanotubes supported by metal oxide catalyst nanoparticles. Synthesizing silicon carbide nanotubes may include exposing the carbon nanotubes supported by metal oxide catalyst nanoparticles to silicon vapor. This creates a quantity of silicon carbide precursor nanoparticles including silicon carbide nanotubes supported by metal oxide catalyst nanoparticles.

Synthesizing silicon carbide nanotubes may further include heating the carbon nanotubes supported by metal oxide catalyst nanoparticles to from 300° C. to 1600° C., from 300° C. to 1400° C., from 300° C. to 1200° C., from 300° C. to 1000° C., from 300° C. to 900° C., from 300° C. to 800° C., from 300° C. to 700° C., from 300° C. to 600° C., from 600° C. to 700° C., from 600° C. to 800° C., from 600° C. to 900° C., from 600° C. to 1000° C., from 600° C. to 1200° C., from 600° C. to 1400° C., from 600° C. to 1600° C., from 700° C. to 800° C., from 700° C. to 900° C., from 700° C. to 1100° C., from 700° C. to 1400° C., from 800° C. to 900° C., from 800° C. to 1100° C., from 800° C. to 1400° C., from 900° C. to 1100° C., from 900° C. to 1400° C., or from 1100° C. to 1400° C. In some embodiments, heating the carbon nanotubes supported by metal oxide catalyst nanoparticles may include placing the carbon nanotubes supported by metal oxide catalyst nanoparticles into an oven or a reactor. In some embodiments, the reactor may be evacuated to an absolute pressure of from $1\times10^{-100}$ Torr to $1\times10^{-50}$ Torr, $1\times10^{-50}$ Torr to $1\times10^{-25}$ Torr, $1\times10^{-25}$ Torr to $1\times10^{-10}$ Torr, $1\times10^{-10}$ Torr to $1\times10^{-5}$ Torr, $1\times10^{-5}$ Torr to $1\times10^{-1}$ Torr, $1\times10^{-1}$ Torr to 0.5 Torr, 0.5 Torr to 1 Torr, 1 Torr to 10 Torr, 10 Torr to 20 Torr, 20 Torr to 40, 40 Torr to 50 Torr, 50 Torr to 100 Torr, 100 Torr to 150 Torr, 150 Torr to 300 Torr, 300 Torr to 450 Torr, 450 Torr to 600 Torr, 600 Torr to 750 Torr, or any combination of these.

In some embodiments, synthesizing the silicon carbide nanotubes supported by metal oxide catalyst nanoparticles may include placing silicon precursors in the oven. The silicon precursors vaporize as the oven heats and forms a quantity of silicon carbide precursor nanoparticles. This quantity of silicon carbide precursor nanoparticles includes silicon carbide nanotubes and metal oxide catalyst nanoparticles. In other embodiments, synthesizing the silicon carbide nanotubes may include flowing a gas mixture over the carbon nanotubes to form the quantity of silicon carbide precursor nanoparticles. In some embodiments, the gas mixture may include argon, hydrogen, silicon, methyltrichlorosilane, any other gas containing silicon, and combinations of these. Specifically, in one embodiment, the gas mixture may include argon, hydrogen, and methyltrichlorosilane.

In some embodiments, heating the carbon nanotubes supported by metal oxide catalyst nanoparticles includes flowing a gas mixture over the carbon nanotubes supported by metal oxide catalyst nanoparticles with a heating rate of from 1° C./min. to 20° C./min., from 3° C./min. to 10° C./min., from 5° C./min. to 10° C./min., from 5° C./min. to 7° C./min., or of 5° C./min. Heating the carbon nanotubes supported by metal oxide catalyst nanoparticles may further include adding from 0 to 50 volume percent (vol. %), from 2 to 30 vol. %, from 2 to 20 vol. %, from 2 to 15 vol. %, from 2 to 10 vol. %, from 2 to 5 vol. %, from 5 to 30 vol. %, from 5 to 20 vol. %, from 5 to 15 vol. %, from 5 to 10 vol. %, from 10 to 30 vol. %, from 10 to 20 vol. %, from 10 to 15 vol. %, from 15 to 30 vol. %, from 15 to 20 vol. %, or from 20 to 30 vol. % silicon-based gas (as calculated by a volume of the gas mixture) to the gas mixture. In some embodiments the method may further include flowing the gas mixture over the carbon nanotubes supported by metal oxide catalyst nanoparticles to form the quantity of silicon carbide precursor nanoparticles. The silicon-based gas may include any gas that includes silicon, such as, as non-limiting examples, methyltrichlorosilane, N-sec-butyl(trimethylsilyl)amine, chloropentamethyldisilane, hexamethyldisilane, pentamethyldisilane, silicon tetrabromide, triethylsilane, or any other gas including silicon, or mixtures of these. The gas mixture including argon, hydrogen, and silicon may include from 20 to 50 vol. %, from 20 to 40 vol. %, from 20 to 35 vol. %, from 20 to 30 vol. %, from 30 to 50 vol. %, from 30 to 40 vol. %, from 30 to 35 vol. %, from 35 to 40 vol. %, from 35 to 50 vol. %, or from 40 to 50 vol. % hydrogen, as calculated by a volume of the gas mixture, and from 50 to 80 vol. %, from 50 to 70 vol. %, from 50 to 65 vol. %, from 50 to 60 vol. %, from 60 to 65 vol. %, from 60 to 70 vol. %, from 60 to 80 vol. %, from 65 to 80 vol. %, from 65 to 70 vol. %, or from 70 to 80 vol. % argon, as calculated by a volume of the gas mixture. Flowing the gas mixture may include flowing the gas mixture at a rate of from 10 to 1000 ml/min., from 50 to 800 ml/min., from 100 to 400 ml/min., or at 150 ml/min. According to some embodiments, the gas mixture may be prepared by flowing hydrogen gas through methyltricholorosilane, thereby generating the silicon-based gas.

The silicon carbide nanotubes supported by metal oxide catalyst nanoparticles may be annealed in air at an elevated temperature. As used in this disclosure, annealing refers to the process of heating a substrate under a specific atmosphere to an annealing temperature, holding the substrate at the annealing temperature for a period of time, and allowing the substrate to cool. An annealing temperature is a temperature less than the melting temperature of the substrate. For example, the silicon carbide nanotubes supported by metal oxide catalyst nanoparticles may be annealed at a temperature from 500° C. to 600° C., from 600° C. to 700° C., from 700° C. to 800° C., from 800° C. to 900° C., from 900° C. to 1000° C., from 1000° C. to 1100° C., from 1100° C. to 1200° C., from 1200° C. to 1300° C., from 1300° C. to 1400° C., from 1400° C. to 1500° C., from 1500° C. to 1600° C., from 1600° C. to 1700° C., from 1700° C. to 1800° C., or any combination of these. For example, the silicon carbide nanotubes supported by metal oxide catalyst nanoparticles may be held at the annealing temperature for from 0.001 minute (min) to 5 min, from 5 min to 10 min, from 10 min to 20 min, from 20 min to 30 min, from 30 min to 40 min, from 40 min to 50 min, from 50 min to 60 min, from 60 min to 70 min, or even greater than 70 min, or any combination of these. The annealing step may further include a cooling step in which the temperature of the silicon carbide nanotubes supported by metal oxide catalyst nanoparticles may be reduced by from 200° C./min. to 150° C./min., from 150° C./min. to 100° C./min., from 100° C./min. to 50° C./min., from 50° C./min. to 25° C./min., from 25° C./min. to 20° C./min., from 20° C./min. to 15° C./min., from 15° C./min. to 10° C./min., from 10° C./min. to 5° C./min., from 5° C./min. to 1° C./min., from 1° C./min. to 0.5° C./min., from 0.5° C./min. to 0.1° C./min., or even less than 0.1° C./min., or any combination of these. The annealing step may occur under a specific atmosphere where the specific atmosphere includes air, inert gas, a reducing gas, an oxidizing gas, or a combination of these.

As stated previously, the method includes adding a quantity of precursor nanoparticles including carbon nanotubes supported by metal oxide catalyst nanoparticles to the hydraulic fracturing fluid. The metal oxide catalyst nanoparticles and the hydraulic fracturing fluid are selected such that the metal oxide catalyst nanoparticles are dissolvable in the hydraulic fracturing fluid. The metal oxide catalyst nanoparticles are operable to dissolve in the hydraulic fracturing fluid, which results in an amount of carbon nanotubes dispersed within the hydraulic fracturing fluid. The dispersion of the amount of carbon nanotubes increases the value of at least one of a Newtonian viscosity, a yield point, a plastic viscosity, and a density of the hydraulic fracturing fluid with the dispersed carbon nanotubes versus a similar or equivalent hydraulic fracturing fluid without the carbon nanotube dispersion.

The metal oxide catalyst nanoparticles dissolve in the hydraulic fracturing fluid, which leaves the carbon nanotubes dispersed within the hydraulic fracturing fluid in approximately the same placement and orientation they were in before the metal oxide catalyst nanoparticles dissolved. This results in dispersed carbon nanotubes throughout the hydraulic fracturing fluid and no clumps of carbon nanotubes as are formed with conventional methods. In some embodiments, the hydraulic fracturing fluid has a persistent dispersion homogeneity. The phrase "persistent dispersion homogeneity" means that a first concentration of the carbon nanotubes at any discrete point throughout the hydraulic fracturing fluid does not vary by more than 30% from a second concentration of the carbon nanotubes at any second discrete point throughout the hydraulic fracturing fluid. In other words, the concentration of the carbon nanotubes will not result in clumped carbon nanotubes at any point within the hydraulic fracturing fluid. In the embodiments described in this disclosure, the persistent dispersion homogeneity throughout the hydraulic fracturing fluid is such that, for a discrete point throughout the hydraulic fracturing fluid, the extrema (the minimum or maximum) of the concentration of carbon nanotubes is greater than or equal to about 70% and less than or equal to about 130% of the concentration of carbon nanotubes within the hydraulic fracturing fluid at any second discrete point of the hydraulic fracturing fluid.

Furthermore, as the metal oxide catalyst nanoparticles dissolve, the metal oxide catalyst nanoparticles may serve as a pH buffer. In some embodiments, the metal oxide catalyst nanoparticles may increase the pH of the hydraulic fracturing fluid to greater than 7. In some embodiments, the metal oxide catalyst nanoparticles may increase the pH of the hydraulic fracturing fluid to from 9 to 12, from 9 to 11, from 9 to 10.5, from 9 to 10, from 10 to 12, from 10 to 11, from 10 to 10.5, from 10.5 to 12, from 10.5 to 11, or from 11 to 12. Specifically, the metal oxide catalyst nanoparticles may increase the pH of an aqueous hydraulic fracturing fluid with a first pH of from 5 to 9, of from 6 to 8, of from 6.5 to 7.5, or of 7 to a second pH of from 9 to 12, from 9 to 11, from 9 to 10.5, from 9 to 10, from 10 to 12, from 10 to 11, from 10 to 10.5, from 10.5 to 12, from 10.5 to 11, or from 11 to 12.

In some embodiments, the method may further include functionalizing a surface of the carbon nanotubes before adding the quantity of precursor nanoparticles including carbon nanotubes supported by metal oxide catalyst nanoparticles to the hydraulic fracturing fluid, the metal oxide catalyst nanoparticles and the hydraulic fracturing fluid being selected such that the metal oxide catalyst nanoparticles are dissolvable in the hydraulic fracturing fluid. In another embodiment, the method may further include functionalizing a surface of the carbon nanotubes after adding the quantity of precursor nanoparticles including carbon nanotubes supported by metal oxide catalyst nanoparticles to the hydraulic fracturing fluid, the metal oxide catalyst nanoparticles and the hydraulic fracturing fluid being selected such that the metal oxide catalyst nanoparticles are dissolvable in the hydraulic fracturing fluid. In yet another embodiment, the method may further include functionalizing a surface of the carbon nanotubes after the metal oxide catalyst nanoparticles dissolve in the hydraulic fracturing fluid. In some embodiments, functionalizing the surface of the carbon nanotubes may include functionalizing the surface of the carbon nanotubes with hydrophilic functional groups. The hydrophilic functional groups may include hydroxyl groups, carbonyl groups, carboxyl groups, amino groups, sulfhydryl groups, phosphate groups, and combinations of these. Specifically, the method may further include functionalizing a surface of the carbon nanotubes with at least one of carboxylates, ammonium derivatives, sulfonated monomers, oligomers, or polymers, after the metal oxide catalyst nanoparticles dissolve in the hydraulic fracturing fluid.

In embodiments, the carbon nanotube dispersion may increase the Newtonian viscosity of the hydraulic fracturing fluid with the dispersed carbon nanotubes versus a similar or equivalent hydraulic fracturing fluid without the carbon nanotube dispersion by 500 centiPoise (cP). In some embodiments, the carbon nanotube dispersion may increase the Newtonian viscosity of the hydraulic fracturing fluid with the dispersed carbon nanotubes versus a similar or equivalent hydraulic fracturing fluid without the carbon nanotube dispersion by from 5 to 2000 cP, from 5 to 1000 cP, from 5 to 700 cP, from 5 to 600 cP, from 5 to 500 cP, from 5 to 400 cP, from 5 to 200 cP, from 5 to 100 cP, from 5 to 50 cP, from 50 to 2000 cP, from 50 to 1000 cP, from 50 to 700 cP, from 50 to 600 cP, from 50 to 500 cP, from 50 to 400 cP, from 50 to 200 cP, from 50 to 100 cP, from 100 to 2000 cP, from 100 to 1000 cP, from 100 to 700 cP, from 100 to 600 cP, from 100 to 500 cP, from 100 to 400 cP, from 100 to 200 cP, from 200 to 2000 cP, from 200 to 1000 cP, from 200 to 700 cP, from 200 to 600 cP, from 200 to 500 cP, from 200 to 400 cP, from 400 to 2000 cP, from 400 to 1000 cP, from 400 to 700 cP, from 400 to 600 cP, from 400 to 500 cP, from 500 to 2000 cP, from 500 to 1000 cP, from 500 to 700 cP, from 500 to 600 cP, from 600 to 2000 cP, from 600 to 1000 cP, from 600 to 700 cP, from 700 to 2000 cP, from 700 to 1000 cP, or from 1000 to 2000 cP. In some embodiments, the carbon nanotube dispersion may increase the Newtonian viscosity of the hydraulic fracturing fluid with the dispersed carbon nanotubes versus a similar or equivalent hydraulic fracturing fluid without the carbon nanotube dispersion by 10%, 20%, 30%, 40%, 50%, 60%, 70%, 80%, 90%, 100%, 125%, 150%, 200%, 250%, 300%, or 500%.

The method may further include adding the additives previously described into the hydraulic fracturing fluid. Adding the additives may involve mixing the additives into the hydraulic fracturing fluid. In some embodiments, the hydraulic fracturing fluid may be mixed at a shear speed of from 4000 rotations per minute (RPM) to 16000 RPM. The hydraulic fracturing fluid may be mixed at a shear speed of from 4000 RPM to 15000 RPM, or from 5000 RPM to 15000 RPM, or from 5000 RPM to 1000 RPM, or from 8000 RPM to 16000 RPM, or from 10000 RPM to 16000 RPM, or from 12000 RPM to 16000 RPM.

Embodiments of the disclosure may also relate to methods for using the hydraulic fracturing fluid. The hydraulic fracturing fluid may be in accordance with any of the embodiments previously described. In some embodiments, the hydraulic fracturing fluid may be introduced into a subterranean formation. Introducing may involve injecting or pumping the hydraulic fracturing fluid into the subterranean formation, which, in some embodiments, may be a well. The hydraulic fracturing fluid may be circulated within the subterranean formation. In some embodiments, a mud pump may be used to inject the hydraulic fracturing fluid into the subterranean formation.

As previously described, fluid rheology is an important parameter of hydraulic fracturing fluid performance. For critical offshore applications with extreme temperature and pressure requirements, the viscosity profile of the fluid often is measured with a controlled temperature and pressure rotational viscometer (for instance, an iX77 Rheometer, commercially available from Fann Instruments (Houston, Tex.)). Fluids may be tested at temperatures of from 35° F. to 500° F., with pressures of up to 20,000 pounds per square inch (psi). Cold-fluid rheology may be important because of the temperatures less than 32° F. that the fluid is exposed to in deepwater risers. Temperatures greater than 100° F. may be encountered in deep wells or in geothermally heated wells. The fluid may be under pressures greater than 2,000 psi downhole, and its viscosity profile may change accordingly. The rheological behavior of the hydraulic fracturing fluid, such as gel strength, plastic viscosity, and yield point, may be determined from measurements of the viscosity, shear stress, and shear rate.

The gel strength of a hydraulic fracturing fluid refers to the shear stress of the hydraulic fracturing fluid measured at a shear rate less than 10 RPM following a defined period of time during which the hydraulic fracturing fluid is maintained in a static state. The hydraulic fracturing fluids of the present disclosure may have a gel strength after 10 seconds of from 0.5 to 30 pounds force per 100 cubic feet ($lb_f/100$ $ft^2$). In some embodiments, the hydraulic fracturing fluid may have a gel strength after 10 seconds of from 0.5 to 100 $lb_f/100$ $ft^2$, from 0.5 to 60 $lb_f/100$ $ft^2$, from 0.5 to 50 $lb_f/100$ $ft^2$, from 0.5 to 40 $lb_f/100$ $ft^2$, from 0.5 to 30 $lb_f/100$ $ft^2$, from 0.5 to 20 $lb_f/100$ $ft^2$, from 0.5 to 15 $lb_f/100$ $ft^2$, from 0.5 to 10 $lb_f/100$ $ft^2$, from 0.5 to 5 $lb_f/100$ $ft^2$, from 0.5 to 1 $lb_f/100$ $ft^2$, from 1 to 100 $lb_f/100$ $ft^2$, from 1 to 60 $lb_f/100$ $ft^2$, from 1 to 50 $lb_f/100$ $ft^2$, from 1 to 40 $lb_f/100$ $ft^2$, from 1 to 30 $lb_f/100$ $ft^2$, from 1 to 20 $lb_f/100$ $ft^2$, from 1 to 15 $lb_f/100$ $ft^2$, from 1 to 10 $lb_f/100$ $ft^2$, from 1 to 5 $lb_f/100$ $ft^2$, from 5 to 100 $lb_f/100$ $ft^2$, from 5 to 60 $lb_f/100$ $ft^2$, from 5 to 50 $lb_f/100$ $ft^2$, from 5 to 40 $lb_f/100$ $ft^2$, from 5 to 30 $lb_f/100$ $ft^2$, from 5 to 20 $lb_f/100$ $ft^2$, from 5 to 15 $lb_f/100$ $ft^2$, from 5 to 10 $lb_f/100$ $ft^2$, from 10 to 100 $lb_f/100$ $ft^2$, from 10 to 60 $lb_f/100$ $ft^2$, from 10 to 50 $lb_f/100$ $ft^2$, from 10 to 40 $lb_f/100$ $ft^2$, from 10 to 30 $lb_f/100$ $ft^2$, from 10 to 20 $lb_f/100$ $ft^2$, from 10 to 15 $lb_f/100$ $ft^2$, from 15 to 100 $lb_f/100$ $ft^2$, from 15 to 60 $lb_f/100$ $ft^2$, from 15 to 50 $lb_f/100$ $ft^2$, from 15 to 40 $lb_f/100$ $ft^2$, from 15 to 30 $lb_f/100$ $ft^2$, from 15 to 20 $lb_f/100$ $ft^2$, from 20 to 100 $lb_f/100$ $ft^2$, from 20 to 60 $lb_f/100$ $ft^2$, from 20 to 50 $lb_f/100$ $ft^2$, from 20 to 40 $lb_f/100$ $ft^2$, from 20 to 30 $lb_f/100$ $ft^2$, from 30 to 100 $lb_f/100$ $ft^2$, from 30 to 60 $lb_f/100$ $ft^2$, from 30 to 50 $lb_f/100$ $ft^2$, from 30 to 40 $lb_f/100$ $ft^2$, from 40 to 100 $lb_f/100$ $ft^2$, from 40 to 60 $lb_f/100$ $ft^2$, from 40 to 50 $lb_f/100$ $ft^2$, from 50 to 100 $lb_f/100$ $ft^2$, from 50 to 60 $lb_f/100$ $ft^2$, or from 60 to 100 $lb_f/100$ $ft^2$. In some embodiments, the carbon nanotube dispersion may increase the 10-second gel strength of the hydraulic fracturing fluid with the dispersed carbon nanotubes versus a similar or equivalent hydraulic fracturing fluid without the carbon nanotube dispersion by 10%, 20%, 30%, 40%, 50%, 60%, 70%, 80%, 90%, 100%, 125%, 150%, 200%, 250%, 300%, or 500%.

Similarly, the hydraulic fracturing fluids of the present disclosure may have a gel strength after 10 minutes of from 0.5 to 50 $lb_f/100$ $ft^2$. In some embodiments, the hydraulic fracturing fluid may have a gel strength after 10 seconds of from 0.5 to 100 $lb_f/100$ $ft^2$, from 0.5 to 60 $lb_f/100$ $ft^2$, from 0.5 to 50 $lb_f/100$ $ft^2$, from 0.5 to 40 $lb_f/100$ $ft^2$, from 0.5 to 30 $lb_f/100$ $ft^2$, from 0.5 to 20 $lb_f/100$ $ft^2$, from 0.5 to 15 $lb_f/100$ $ft^2$, from 0.5 to 10 $lb_f/100$ $ft^2$, from 0.5 to 5 $lb_f/100$ $ft^2$, from 0.5 to 1 $lb_f/100$ $ft^2$, from 1 to 100 $lb_f/100$ $ft^2$, from 1 to 60 $lb_f/100$ $ft^2$, from 1 to 50 $lb_f/100$ $ft^2$, from 1 to 40 $lb_f/100$ $ft^2$, from 1 to 30 $lb_f/100$ $ft^2$, from 1 to 20 $lb_f/100$ $ft^2$, from 1 to 15 $lb_f/100$ $ft^2$, from 1 to 10 $lb_f/100$ $ft^2$, from 1 to 5 $lb_f/100$ $ft^2$, from 5 to 100 $lb_f/100$ $ft^2$, from 5 to 60 $lb_f/100$ $ft^2$, from 5 to 50 $lb_f/100$ $ft^2$, from 5 to 40 $lb_f/100$ $ft^2$, from 5 to 30 $lb_f/100$ $ft^2$, from 5 to 20 $lb_f/100$ $ft^2$, from 5 to 15 $lb_f/100$ $ft^2$, from 5 to 10 $lb_f/100$ $ft^2$, from 10 to 100 $lb_f/100$ $ft^2$, from 10 to 60 $lb_f/100$ $ft^2$, from 10 to 50 $lb_f/100$ $ft^2$, from 10 to 40 $lb_f/100$ $ft^2$, from 10 to 30 $lb_f/100$ $ft^2$, from 10 to 20 $lb_f/100$ $ft^2$, from 10 to 15 $lb_f/100$ $ft^2$, from 15 to 100 $lb_f/100$ $ft^2$, from 15 to 60 $lb_f/100$ $ft^2$, from 15 to 50 $lb_f/100$ $ft^2$, from 15 to 40 $lb_f/100$ $ft^2$, from 15 to 30 $lb_f/100$ $ft^2$, from 15 to 20 $lb_f/100$ $ft^2$, from 20 to 100 $lb_f/100$ $ft^2$, from 20 to 60 $lb_f/100$ $ft^2$, from 20 to 50 $lb_f/100$ $ft^2$, from 20 to 40 $lb_f/100$ $ft^2$, from 20 to 30 $lb_f/100$ $ft^2$, from 30 to 100 $lb_f/100$ $ft^2$, from 30 to 60 $lb_f/100$ $ft^2$, from 30 to 50 $lb_f/100$ $ft^2$, from 30 to 40 $lb_f/100$ $ft^2$, from 40 to 100 $lb_f/100$ $ft^2$, from 40 to 60 $lb_f/100$ $ft^2$, from 40 to 50 $lb_f/100$ $ft^2$, from 50 to 100 $lb_f/100$ $ft^2$, from 50 to 60 $lb_f/100$ $ft^2$, or from 60 to 100 $lb_f/100$ $ft^2$. In some embodiments, the carbon nanotube dispersion may increase the 10-minute gel strength of the hydraulic fracturing fluid with the dispersed carbon nanotubes versus a similar or equivalent hydraulic fracturing fluid without the carbon nanotube dispersion by 10%, 20%, 30%, 40%, 50%, 60%, 70%, 80%, 90%, 100%, 125%, 150%, 200%, 250%, 300%, or 500%.

The rheological behavior of the hydraulic fracturing fluid may be determined by measuring the shear stress on the hydraulic fracturing fluid at different shear rates, which may be accomplished by measuring the shear stress or shear rate on the hydraulic fracturing fluid. The various shear rates are utilized as hydraulic fracturing fluid behaves as a rigid body at lesser shear stresses but flows as a viscous fluid at greater shear stresses. The rheology of the hydraulic fracturing fluid may be characterized by the plastic viscosity (PV) in centiPoise (cP) and the yield point (YP), which are parameters from the Bingham plastic rheology model. The PV is related to the resistance of the hydraulic fracturing fluid to flow due to mechanical interaction between the solids of the hydraulic fracturing fluid and represents the viscosity of the hydraulic fracturing fluid extrapolated to infinite shear rate. The PV reflects the type and concentration of the solids in the hydraulic fracturing fluid. The PV of a hydraulic fracturing fluid may be estimated by measuring the shear stress of the hydraulic fracturing fluid using the previously described rheometer at spindle speeds of 300 rotations per minute (RPM) and 600 RPM and subtracting the 300 RPM dial reading from the 600 RPM dial reading according to Equation 2:

$$PV(cP)=(\text{dial reading at 600RPM})-(\text{dial reading at 300RPM}) \quad \text{Equation 2}$$

The hydraulic fracturing fluids of the present disclosure may have a PV of from 5 to 2000 cP. In some embodiments, the hydraulic fracturing fluid may have a PV of from 5 to 5000 cP, from 5 to 1500 cP, from 5 to 1000 cP, from 5 to 500 cP, from 5 to 100 cP, from 5 to 50 cP, from 50 to 5000 cP, from 50 to 2000 cP, from 50 to 1500 cP, from 50 to 1000 cP, from 50 to 500 cP, from 50 to 100 cP, from 100 to 5000 cP, from 100 to 2000 cP, from 100 to 1500 cP, from 100 to 1000 cP, from 100 to 500 cP, from 500 to 5000 cP, from 500 to 2000 cP, from 500 to 1500 cP, from 500 to 1000 cP, from 1000 to 5000 cP, from 1000 to 2000 cP, from 1000 to 1500 cP, from 1500 to 5000 cP, from 1500 to 2000 cP, or from 2000 to 5000 cP. In some embodiments, the carbon nanotube dispersion may increase the PV of the hydraulic fracturing fluid with the dispersed carbon nanotubes versus a similar or equivalent hydraulic fracturing fluid without the carbon nanotube dispersion by 10%, 20%, 30%, 40%, 50%, 60%, 70%, 80%, 90%, 100%, 125%, 150%, 200%, 250%, 300%, or 500%.

The hydraulic fracturing fluid behaves as a rigid body when the shear stress is less than the YP, and the hydraulic fracturing fluid flows as a viscous fluid when the shear stress is greater than the YP. In other words, the YP represents the amount of stress required to move the hydraulic fracturing fluid from a static condition. The YP is expressed as a force per area, such as pounds of force per one hundred square feet ($lb_f/100 \text{ ft}^2$) for example. YP provides an indication of the ability of the hydraulic fracturing fluid to carry proppants through the annulus, which in simplified terms gives an indication of the hydraulic fracturing fluid's hole-cleaning ability. The YP is determined by extrapolating the Bingham plastic rheology model to a shear rate of zero. The YP may be estimated from the PV (as measured in accordance with Equation 2, as previously described) according to Equation 3:

$$YP=(\text{dial reading at 300 RPM})-PV \quad \text{Equation 3}$$

The hydraulic fracturing fluids of the present disclosure may have a YP of from 0.5 to 50 $lb_f/100 \text{ ft}^2$. In some embodiments, the hydraulic fracturing fluids of the present disclosure may have a YP of from 0.5 to 100 $lb_f/100 \text{ ft}^2$, from 0.5 to 60 $lb_f/100 \text{ ft}^2$, from 0.5 to 40 $lb_f/100 \text{ ft}^2$, from 0.5 to 30 $lb_f/100 \text{ ft}^2$, from 0.5 to 20 $lb_f/100 \text{ ft}^2$, from 0.5 to 15 $lb_f/100 \text{ ft}^2$, from 0.5 to 10 $lb_f/100 \text{ ft}^2$, from 0.5 to 5 $lb_f/100 \text{ ft}^2$, from 0.5 to 1 $lb_f/100 \text{ ft}^2$, from 1 to 100 $lb_f/100 \text{ ft}^2$, from 1 to 60 $lb_f/100 \text{ ft}^2$, from 1 to 50 $lb_f/100 \text{ ft}^2$, from 1 to 40 $lb_f/100 \text{ ft}^2$, from 1 to 30 $lb_f/100 \text{ ft}^2$, from 1 to 20 $lb_f/100 \text{ ft}^2$, from 1 to 15 $lb_f/100 \text{ ft}^2$, from 1 to 10 $lb_f/100 \text{ ft}^2$, from 1 to 5 $lb_f/100 \text{ ft}^2$, from 5 to 100 $lb_f/100 \text{ ft}^2$, from 5 to 60 $lb_f/100 \text{ ft}^2$, from 5 to 50 $lb_f/100 \text{ ft}^2$, from 5 to 40 $lb_f/100 \text{ ft}^2$, from 5 to 30 $lb_f/100 \text{ ft}^2$, from 5 to 20 $lb_f/100 \text{ ft}^2$, from 5 to 15 $lb_f/100 \text{ ft}^2$, from 5 to 10 $lb_f/100 \text{ ft}^2$, from 10 to 100 $lb_f/100 \text{ ft}^2$, from 10 to 60 $lb_f/100 \text{ ft}^2$, from 10 to 50 $lb_f/100 \text{ ft}^2$, from 10 to 40 $lb_f/100 \text{ ft}^2$, from 10 to 30 $lb_f/100 \text{ ft}^2$, from 10 to 20 $lb_f/100 \text{ ft}^2$, from 10 to 15 $lb_f/100 \text{ ft}^2$, from 15 to 100 $lb_f/100 \text{ ft}^2$, from 15 to 60 $lb_f/100 \text{ ft}^2$, from 15 to 50 $lb_f/100 \text{ ft}^2$, from 15 to 40 $lb_f/100 \text{ ft}^2$, from 15 to 30 $lb_f/100 \text{ ft}^2$, from 15 to 20 $lb_f/100 \text{ ft}^2$, from 20 to 100 $lb_f/100 \text{ ft}^2$, from 20 to 60 $lb_f/100 \text{ ft}^2$, from 20 to 50 $lb_f/100 \text{ ft}^2$, from 20 to 40 $lb_f/100 \text{ ft}^2$, from 20 to 30 $lb_f/100 \text{ ft}^2$, from 30 to 100 $lb_f/100 \text{ ft}^2$, from 30 to 60 $lb_f/100 \text{ ft}^2$, from 30 to 50 $lb_f/100 \text{ ft}^2$, from 30 to 40 $lb_f/100 \text{ ft}^2$, from 40 to 100 $lb_f/100 \text{ ft}^2$, from 40 to 60 $lb_f/100 \text{ ft}^2$, from 40 to 50 $lb_f/100 \text{ ft}^2$, from 50 to 100 $lb_f/100 \text{ ft}^2$, from 50 to 60 $lb_f/100 \text{ ft}^2$, or from 60 to 100 $lb_f/100 \text{ ft}^2$. In some embodiments, the carbon nanotube dispersion may increase the YP of the hydraulic fracturing fluid with the dispersed carbon nanotubes versus a similar or equivalent hydraulic fracturing fluid without the carbon nanotube dispersion by 10%, 20%, 30%, 40%, 50%, 60%, 70%, 80%, 90%, 100%, 125%, 150%, 200%, 250%, 300%, or 500%.

A method for increasing a rate of hydrocarbon production from a subsurface formation is also disclosed. A hydraulic fracturing fluid may be used to propagate fractures within a subsurface formation and further open fractures. The hydraulic fracturing fluid may be any of the hydraulic fracturing fluids previously disclosed. Proppants within a hydraulic fracturing fluid may aid in treating subsurface fractures, to prop open and keep open the fracture. The method may include producing a first rate of production of hydrocarbons from the subsurface formation, in which the hydrocarbons have a first interfacial tension, and introducing a hydraulic fracturing fluid including the proppants into the subsurface formation, in which the pressure from the introduction of the hydraulic fracturing fluid causes fractures to form within the formation and proppants enter the fractures, propping the fracture open and thereby increasing the porosity and permeability of the subsurface formation near a wellbore. The method may further include increasing hydrocarbon production from the subsurface formation by producing a second rate of production of hydrocarbons from the subsurface formation, in which the second rate of production of hydrocarbons is greater than the first rate of production of hydrocarbons.

The hydraulic fracturing fluid in the subsurface fracture may include proppants suspended in the hydraulic fracturing fluid. In some embodiments, the proppants may be distributed throughout the hydraulic fracturing fluid. The proppants may not aggregate or otherwise coalesce within the hydraulic fracturing fluid due to the dispersion of carbon nanotubes throughout the hydraulic fracturing fluid. The hydraulic fracturing fluid may be pumped into the subsurface formation or may be otherwise contacted with the subsurface formation.

Embodiments of methods of treating a subsurface formation may include propagating at least one subsurface fracture in the subsurface formation to treat the subsurface formation. In some embodiments, the subsurface formation may be a rock or shale subsurface formation. In some embodiments, contacting of the subsurface formation may include drilling into the subsurface formation and subsequently injecting the hydraulic fracturing fluid into at least one subsurface fracture in the subsurface formation. In some embodiments, the hydraulic fracturing fluid may be pressurized before being injected into the subsurface fracture in the subsurface formation.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

The presently described subject matter may include one or more aspects, which should not be regarded as limiting on the teachings of the present disclosure. A first aspect may include a method of suspending proppants in a hydraulic fracturing fluid comprising: adding a quantity of precursor nanoparticles comprising carbon nanotubes supported by metal oxide catalyst nanoparticles to the hydraulic fracturing fluid; and adding proppants to the hydraulic fracturing fluid after the addition of the precursor nanoparticles, in which: the metal oxide catalyst nanoparticles and the hydraulic fracturing fluid are selected such that the metal oxide catalyst nanoparticles are dissolvable in the hydraulic fracturing fluid, the metal oxide catalyst nanoparticles are capable of dissolving in the hydraulic fracturing fluid such that an amount of carbon nanotubes are dispersed within the hydraulic fracturing fluid, at least one of a Newtonian viscosity, a yield point, a plastic viscosity, and a density value of the hydraulic fracturing fluid is greater with the presence of the dispersed carbon nanotubes compared to an equivalent hydraulic fracturing fluid without the carbon nanotubes, and an amount of suspended proppants in the hydraulic fracturing fluid is increased with the presence of the dispersed carbon nanotubes compared to an equivalent hydraulic fracturing fluid without the carbon nanotubes.

A second aspect may include a method of suspending proppants in a hydraulic fracturing fluid comprising: synthesizing carbon nanotubes via chemical vapor deposition on metal oxide catalyst nanoparticles to form a quantity of precursor nanoparticles, in which individual nanoparticles of the metal oxide catalyst nanoparticles comprise a transition metal disposed on a metal oxide; adding the quantity of precursor nanoparticles to the hydraulic fracturing fluid; and adding proppants to the hydraulic fracturing fluid after the addition of the precursor nanoparticles, in which: the metal oxide catalyst nanoparticles and the hydraulic fracturing fluid are selected such that the metal oxide catalyst nanoparticles are dissolvable in the hydraulic fracturing fluid, the hydraulic fracturing fluid comprises at least one surfactant, the metal oxide catalyst nanoparticles are capable of dissolving in the hydraulic fracturing fluid such that an amount of carbon nanotubes are dispersed within the hydraulic fracturing fluid, at least one of a Newtonian viscosity, a yield point, a plastic viscosity, and a density value of the hydraulic fracturing fluid is greater with the presence of the dispersed carbon nanotubes compared to an equivalent hydraulic fracturing fluid without the carbon nanotubes, and an amount of suspended proppants in the hydraulic fracturing fluid is increased with the presence of the dispersed carbon nanotubes compared to an equivalent hydraulic fracturing fluid without the carbon nanotubes.

A third aspect may include a hydraulic fracturing fluid substantially as described in this disclosure, or including one or more of the features described in this disclosure.

Another aspect includes any of the previous aspects, in which individual nanoparticles of the metal oxide catalyst nanoparticles comprise a metal oxide and a transition metal.

Another aspect includes any of the previous aspects, in which the transition metal comprises Fe, Co, or Ni.

Another aspect includes any of the previous aspects, in which the metal oxide comprises MgO or CaO.

Another aspect includes any of the previous aspects, in which the transition metal is disposed on the metal oxide.

Another aspect includes any of the previous aspects, in which the carbon nanotubes are adsorbed onto the metal oxide catalyst nanoparticles.

Another aspect includes any of the previous aspects, in which individual nanoparticles of the metal oxide catalyst nanoparticles comprise 10 wt. % or less transition metal as calculated by a weight of the metal oxide.

Another aspect includes any of the previous aspects, further comprising functionalizing a surface of the carbon nanotubes with at least one of carboxylates, ammonium derivatives, sulfonated monomers, oligomers, or polymers, after adding the quantity of precursor nanoparticles to the hydraulic fracturing fluid.

Another aspect includes any of the previous aspects, further comprising synthesizing carbon nanotubes via chemical vapor deposition on metal oxide catalyst nanoparticles to form the quantity of precursor nanoparticles.

Another aspect includes any of the previous aspects, in which synthesizing carbon nanotubes via chemical vapor deposition on metal oxide catalyst nanoparticles comprises diffusing carbon atoms through the carbon nanotubes.

Another aspect includes any of the previous aspects, in which synthesizing carbon nanotubes via chemical vapor deposition on metal oxide catalyst nanoparticles comprises diffusing carbon atoms along a surface of individual nanoparticles of the metal oxide catalyst nanoparticles.

Another aspect includes any of the previous aspects, in which the hydraulic fracturing fluid comprises a polar aprotic solvent.

Another aspect includes any of the previous aspects, in which the polar aprotic solvent comprises at least one of n-alkyl pyrrolidone, dimethylformamide, or dimethylsulfoxide.

Another aspect includes any of the previous aspects, in which the hydraulic fracturing fluid comprises one or more additives selected from the group consisting of weighting agents, fluid loss control agents, lost circulation control agents, surfactants, antifoaming agents, and combinations of these.

Another aspect includes any of the previous aspects, in which the surfactants comprise at least one of sulfonated polymers, sulfonated alkanes, polycarboxylated ethers, trimethylalkylammonium salts, alkylbenzylammonium salts, proteins, polyethylene glycol derivatives, oligosaccharides, or cholesterol derivatives.

Another aspect includes any of the previous aspects, in which the hydraulic fracturing fluid comprises at least one of natural oil, synthetic oil, diesel oil, mineral oil, hydrogenated olefins, unhydrogenated olefins, poly-alpha olefins, linear olefins, branched olefins, polydiorganosiloxanes, siloxanes, organosiloxanes, esters, ethers, acetals, dialkylcarbonates, hydrocarbons, fatty acids, esters of fatty acids, straight chain, branched or cyclical alkyl ethers of fatty acids, and combinations of these.

Another aspect includes any of the previous aspects, in which the hydraulic fracturing fluid comprises at least one of fresh water, salt water, brine, municipal water, formation water, produced water, well water, filtered water, distilled water, sea water, or combinations of these.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modifications and variations come within the scope of the appended claims and their equivalents.

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method of suspending proppants in a hydraulic fracturing fluid comprising:
    adding a quantity of precursor nanoparticles comprising carbon nanotubes supported by metal oxide catalyst nanoparticles to the hydraulic fracturing fluid; and
    adding proppants to the hydraulic fracturing fluid after the addition of the precursor nanoparticles, in which:
        the metal oxide catalyst nanoparticles and the hydraulic fracturing fluid are selected such that the metal oxide catalyst nanoparticles are dissolvable in the hydraulic fracturing fluid,
        the metal oxide catalyst nanoparticles are capable of dissolving in the hydraulic fracturing fluid such that an amount of carbon nanotubes are dispersed within the hydraulic fracturing fluid,
        at least one of a Newtonian viscosity, a yield point, a plastic viscosity, and a density value of the hydraulic fracturing fluid is greater with the presence of the dispersed carbon nanotubes compared to an equivalent hydraulic fracturing fluid without the carbon nanotubes, and
        an amount of suspended proppants in the hydraulic fracturing fluid is increased with the presence of the dispersed carbon nanotubes compared to an equivalent hydraulic fracturing fluid without the carbon nanotubes.

2. The method of claim 1, in which individual nanoparticles of the metal oxide catalyst nanoparticles comprise a metal oxide and a transition metal.

3. The method of claim 2, in which the transition metal comprises Fe, Co, or Ni.

4. The method of claim 2, in which the metal oxide comprises MgO or CaO.

5. The method of claim 2, in which the transition metal is disposed on the metal oxide.

6. The method of claim 2, in which individual nanoparticles of the metal oxide catalyst nanoparticles comprise 10 wt. % or less transition metal as calculated by a weight of the metal oxide.

7. The method of claim 1, in which the carbon nanotubes are adsorbed onto the metal oxide catalyst nanoparticles.

8. The method of claim 1, further comprising functionalizing a surface of the carbon nanotubes with at least one of carboxylates, ammonium derivatives, sulfonated monomers, oligomers, or polymers, after adding the quantity of precursor nanoparticles to the hydraulic fracturing fluid.

9. The method of claim 1, further comprising synthesizing carbon nanotubes via chemical vapor deposition on metal oxide catalyst nanoparticles to form the quantity of precursor nanoparticles.

10. The method of claim 9, in which synthesizing carbon nanotubes via chemical vapor deposition on metal oxide catalyst nanoparticles comprises diffusing carbon atoms through the carbon nanotubes.

11. The method of claim 9, in which synthesizing carbon nanotubes via chemical vapor deposition on metal oxide catalyst nanoparticles comprises diffusing carbon atoms along a surface of individual nanoparticles of the metal oxide catalyst nanoparticles.

12. The method of claim 1, in which the hydraulic fracturing fluid comprises a polar aprotic solvent comprising at least one of n-alkyl pyrrolidone, dimethylformamide, or dimethylsulfoxide.

13. The method of claim 1, in which:
the hydraulic fracturing fluid comprises one or more additives selected from the group consisting of weighting agents, fluid loss control agents, lost circulation control agents, surfactants, antifoaming agents, and combinations of these; and
the surfactants comprise at least one of sulfonated polymers, sulfonated alkanes, polycarboxylated ethers, trimethylalkylammonium salts, alkylbenzylammonium salts, proteins, polyethylene glycol derivatives, oligosaccharides, or cholesterol derivatives.

14. The method of claim 1, in which:
the hydraulic fracturing fluid comprises at least one of natural oil, synthetic oil, diesel oil, mineral oil, hydrogenated olefins, unhydrogenated olefins, poly-alpha olefins, linear olefins, branched olefins, polydiorganosiloxanes, siloxanes, organosiloxanes, esters, ethers, acetals, dialkylcarbonates, hydrocarbons, fatty acids, esters of fatty acids, straight chain, branched or cyclical alkyl ethers of fatty acids, and combinations of these; and
the hydraulic fracturing fluid comprises at least one of fresh water, salt water, brine, municipal water, formation water, produced water, well water, filtered water, distilled water, sea water, or combinations of these.

15. A method of suspending proppants in a hydraulic fracturing fluid comprising:
synthesizing carbon nanotubes via chemical vapor deposition on metal oxide catalyst nanoparticles to form a quantity of precursor nanoparticles, in which individual nanoparticles of the metal oxide catalyst nanoparticles comprise a transition metal disposed on a metal oxide;
adding the quantity of precursor nanoparticles to the hydraulic fracturing fluid; and
adding proppants to the hydraulic fracturing fluid after the addition of the precursor nanoparticles, in which:
the metal oxide catalyst nanoparticles and the hydraulic fracturing fluid are selected such that the metal oxide catalyst nanoparticles are dissolvable in the hydraulic fracturing fluid,
the hydraulic fracturing fluid comprises at least one surfactant,
the metal oxide catalyst nanoparticles are capable of dissolving in the hydraulic fracturing fluid such that an amount of carbon nanotubes are dispersed within the hydraulic fracturing fluid,
at least one of a Newtonian viscosity, a yield point, a plastic viscosity, and a density value of the hydraulic fracturing fluid is greater with the presence of the dispersed carbon nanotubes compared to an equivalent hydraulic fracturing fluid without the carbon nanotubes, and
an amount of suspended proppants in the hydraulic fracturing fluid is increased with the presence of the dispersed carbon nanotubes compared to an equivalent hydraulic fracturing fluid without the carbon nanotubes.

16. The method of claim 15, in which synthesizing carbon nanotubes via chemical vapor deposition on metal oxide catalyst nanoparticles comprises diffusing carbon atoms through the carbon nanotubes.

17. The method of claim 15, in which synthesizing carbon nanotubes via chemical vapor deposition on metal oxide catalyst nanoparticles comprises diffusing carbon atoms along a surface of individual nanoparticles of the metal oxide catalyst nanoparticles.

18. The method of claim 15, in which the transition metal comprises Fe, Co, or Ni and the metal oxide comprises MgO or CaO.

19. The method of claim 15, in which individual nanoparticles of the metal oxide catalyst nanoparticles comprise 10 wt. % or less transition metal as calculated by a weight of the metal oxide.

20. The method of claim 15, further comprising functionalizing a surface of the carbon nanotubes with at least one of carboxylates, ammonium derivatives, sulfonated monomers, oligomers, or polymers, after adding the quantity of precursor nanoparticles to the hydraulic fracturing fluid.

* * * * *